(12) United States Patent
Patil et al.

(10) Patent No.: US 10,911,349 B2
(45) Date of Patent: Feb. 2, 2021

(54) LINK AGGREGATION WITH FLOATING PRIMARY LINK

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/211,837

(22) Filed: Dec. 6, 2018

(65) Prior Publication Data
US 2019/0158385 A1 May 23, 2019

Related U.S. Application Data

(63) Continuation-in-part of application No. 16/183,586, filed on Nov. 7, 2018.
(Continued)

(51) Int. Cl.
*H04L 12/709* (2013.01)
*H04W 24/08* (2009.01)
(Continued)

(52) U.S. Cl.
CPC .......... *H04L 45/245* (2013.01); *H04W 24/08* (2013.01); *H04W 40/244* (2013.01);
(Continued)

(58) Field of Classification Search
CPC .............. H04W 74/0816; H04W 76/15; H04W 40/244; H04W 72/08; H04L 5/0053
See application file for complete search history.

(56) References Cited

U.S. PATENT DOCUMENTS 9,860,926 B2 * 1/2018 Alanen ................. H04W 48/16
2007/0177549 A1 8/2007 Lo et al.
(Continued)

FOREIGN PATENT DOCUMENTS

WO WO-03075513 A1 9/2003
WO WO-2017189176 A2 11/2017

OTHER PUBLICATIONS

International Search Report and Written Opinion—PCT/US2018/059754—ISA/EPO—dated Feb. 11, 2019.

*Primary Examiner* — Gregory B Sefcheck
*Assistant Examiner* — Debebe A Asefa
(74) *Attorney, Agent, or Firm* — Paradice and Li LLP/Qualco

(57) ABSTRACT

This disclosure provides systems, methods, and apparatuses for dynamically changing a primary communication link on which wireless devices contend for access to a shared wireless medium. An access point (AP) may monitor the channel conditions on a primary link and one or more secondary links of a multi-link environment, and may signal a change in the primary link (such as to one of the secondary links) when one or more conditions are satisfied. The primary and secondary links may be assigned on a per-client basis. Thus, the primary or secondary links of a particular STA may be different than those of other STAs associated with the same AP. In some aspects, each STA may monitor the channel conditions on its own primary and secondary links, and may signal a change in its primary link (such as to one of its secondary links) when one or more conditions are met.

28 Claims, 18 Drawing Sheets

Related U.S. Application Data

(60) Provisional application No. 62/588,232, filed on Nov. 17, 2017.

(51) Int. Cl.
*H04W 40/24* (2009.01)
*H04W 76/15* (2018.01)
*H04W 84/12* (2009.01)
*H04W 72/04* (2009.01)
*H04W 80/02* (2009.01)
*H04W 72/08* (2009.01)

(52) U.S. Cl.
CPC ........ *H04W 76/15* (2018.02); *H04W 72/0446* (2013.01); *H04W 72/08* (2013.01); *H04W 80/02* (2013.01); *H04W 84/12* (2013.01)

(56) References Cited

U.S. PATENT DOCUMENTS

| | | |
|---|---|---|
| 2015/0078298 A1 | 3/2015 | Barriac et al. |
| 2016/0037558 A1* | 2/2016 | Malik .................... H04W 74/08 370/329 |
| 2019/0158413 A1 | 5/2019 | Patil et al. |
| 2020/0068618 A1* | 2/2020 | Ahn ...................... H04W 84/12 |

* cited by examiner

LINK AGGREGATION WITH FLOATING PRIMARY LINK

CROSS-REFERENCE TO RELATED APPLICATIONS

This Patent Application is a continuation-in-part and claims priority under 35 U.S.C. 120 to commonly owned U.S. patent application Ser. No. 16/183,586 entitled "LINK AGGREGATION WITH FLOATING PRIMARY LINK" filed on Nov. 7, 2018, which claims priority to U.S. Provisional Patent Application No. 62/588,232 entitled "LINK AGGREGATION WITH FLOATING PRIMARY LINK" filed on Nov. 17, 2017 and assigned to the assignee hereof. The disclosure of the prior Application is considered part of and is incorporated by reference in this Patent Application.

TECHNICAL FIELD

The present implementations relate generally to wireless communications, and more specifically, to link aggregation in wireless networks.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The shared wireless medium may encompass multiple frequency bands (such as the 2.4 GHz, 5 GHz, or 6 GHz frequency bands) or multiple channels of one or more frequency bands. Link aggregation is a technique that may allow the AP to communicate with a particular STA over multiple concurrent communication "links." For example, to improve data throughput, the shared wireless medium may be divided into a primary link and one or more secondary links. The primary and secondary links may be of various bandwidths, for example, by bonding a number of 20 MHz-wide channels together to form 40 MHz-wide channels, 80 MHz-wide channels, or 160 MHz-wide channels.

The basic building block of a WLAN conforming to the Institute of Electronics Engineers (IEEE) 802.11 family of standards is a Basic Service Set (BSS), which is managed by an AP. Each BSS is identified by a service set identifier (SSID) that is advertised by the AP. Each AP periodically broadcasts beacon frames on the primary link to enable any STAs within wireless range of the AP to establish and maintain a communication link with the WLAN. In a typical WLAN, only one wireless device (AP or STA) may use the wireless medium at any given time. To prevent multiple devices from accessing the shared wireless medium at the same time (which may result in collisions), wireless devices may contend with each other for access to the wireless medium. For example, each wireless device may have a Media Access Controller (MAC) that may be used to contend for access on a particular link.

A wireless device with only one MAC may contend for access on only one of the aggregated links. For example, the wireless device may contend for access on the primary link, and may use the secondary links only if it gains access to the shared wireless medium on the primary link. If the primary link is busy (because another device in the vicinity is transmitting on the same wireless channel), no other wireless devices may access the shared wireless medium even if one or more secondary links are idle. Thus, even with link aggregation, the performance of the wireless network may be limited by the load on the primary link.

SUMMARY

The systems, methods and devices of this disclosure each have several innovative aspects, no single one of which is solely responsible for the desirable attributes disclosed herein.

One innovative aspect of the subject matter of this disclosure can be implemented in a method for wireless communication by a wireless communication device. In some implementations, the method may include steps of establishing a first primary communication link with a first wireless station (STA), the first primary communication link being associated with one or more first wireless channels, access to the first primary communication link being based on contention with the first STA; establishing a second primary communication link with a second STA, the second primary communication link being associated with one or more second wireless channels, access to the second primary communication link being based on contention with the second STA; and selectively accessing a secondary communication link with at least one of the first STA or the second STA based at least in part on having access to the first primary communication link or the second primary communication link, respectively.

Another innovative aspect of the subject matter described in this disclosure can be implemented in a wireless communication device. The wireless communication device includes one or more processors and a memory. The memory stores instructions that, when executed by the one or more processors, cause the wireless communication device to establish a first primary communication link with a STA, the first primary communication link being associated with one or more first wireless channels, access to the first primary communication link being based on contention; establish a second primary communication link with a second STA, the second primary communication link being associated with one or more second wireless channels, access to the second primary communication link being based on contention; and selectively access a secondary communication link with at least one of the first STA or the second STA based at least in part on having access to the first primary communication link or the second primary communication link, respectively.

Some implementations of the methods and wireless communication devices may further include contending for access to the first primary communication link; contending for access to the second primary communication link; and upon gaining access to the first and second primary communication links, concurrently transmitting downlink communications to the first STA and the second STA via the first primary communication link and the second primary communication link, respectively. Some other implementations of the methods and wireless communication devices may further include transmitting a downlink communication to the first STA via the first primary communication link; and receiving an uplink communication from the second STA, via the second primary communication link, concurrently with the transmitting of the first downlink communication.

In some implementations of the methods and wireless communication devices, the secondary communication link with the first STA is associated with the one or more second wireless channels, and selectively accessing the secondary communication link includes attempting to use link aggregation to transmit downlink data to the first STA concurrently via the first primary communication link and the secondary communication link; and selectively contending for access to the second primary communication link based at least in part on the link aggregation attempt. For example, the wireless communication device may contend for access to the second primary communication link when the link aggregation attempt fails and, upon gaining access to the second primary communication link, concurrently transmit downlink communications to the first STA and the second STA via the first primary communication link and the second primary communication link, respectively.

Some implementations of the methods and wireless communication devices may further include reassigning the primary communication link from the one or more second wireless channels to the one or more first wireless channels based at least in part on one or more channel conditions of the first wireless channels, the second wireless channels, or a combination thereof. In some implementations of the methods and wireless communication devices, selectively reassigning the second primary communication link includes receiving primary link information from the second STA indicating a change in the second primary communication link; and dynamically changing the second primary communication link from the one or more second wireless channels to the one or more first wireless channels based at least in part on the primary link information.

In some implementations of the methods and wireless communication devices, receiving the primary link information includes receiving a data frame, a management frame, or a control frame, the data frame, management frame or control frame including an Operating Mode Indication (OMI) control field that includes the primary link information.

Some implementations of the methods and wireless communication devices further include scheduling access to at least one of the first primary communication link or the second primary communication link based at least in part on a target wake time (TWT) service period for the first STA or the second STA.

Some implementations of the methods and wireless communication devices further include transmitting flexibility information to the first STA and the second STA, the flexibility information indicating a capability of the wireless communication device to dynamically change the first primary communication link and the second primary communication link.

Some implementations of the methods and wireless communication devices further include broadcasting beacon frames on the one or more first wireless channels; and broadcasting Fast Initial Link Setup (FILS) discovery frames on the one or more second wireless channels.

Another innovative aspect of the subject matter described in this disclosure can be implemented in a method performed by a wireless communication device. The method may include steps of establishing a primary communication link with an AP, the primary communication link being associated with one or more first wireless channels, access to the primary communication link being based on contention; selectively accessing a secondary communication link with the AP based at least in part on having access to the primary communication link, the secondary communication link being associated with one or more second wireless channels; transmitting primary link information to the AP indicating a change in the primary communication link; and dynamically changing the primary communication link from the one or more first wireless channels to the one or more second wireless channels after transmitting the primary link information to the AP.

Another innovative aspect of the subject matter described in this disclosure can be implemented in a wireless communication device. The wireless communication device includes one or more processors and a memory. The memory stores instructions that, when executed by the one or more processors, cause the wireless communication device to establish a primary communication link with an AP, the primary communication link being associated with one or more first wireless channels, access to the primary communication link being based on contention; selectively access a secondary communication link with the AP based at least in part on having access to the primary communication link, the secondary communication link being associated with one or more second wireless channels; transmit primary link information to the AP indicating a change in the primary communication link; and dynamically change the primary communication link from the one or more first wireless channels to the one or more second wireless channels after transmitting the primary link information to the AP.

In some implementations of the methods and wireless communication devices, transmitting the primary link information to the AP includes determining that an amount of activity on the first wireless channels is above a first threshold level, an amount of activity on the second wireless channels is below a second threshold level, the amount of activity on the first wireless channels exceeds the amount of activity on the second wireless channels, or a combination thereof. The amount of activity on the first wireless channels may be based on a frequency of busy channel conditions on the first wireless channels, a number of failed attempts to access the first wireless channels, a packet error rate (PER) of communications on the first wireless channels, or a latency of communications on the first wireless channels. Similarly, the amount of activity on the second wireless channels may be based on a frequency of busy channel conditions on the second wireless channels, a number of failed attempts to access the second wireless channels, a PER of communication on the second wireless channels, or a latency of communications on the first wireless channels.

In some implementations of the methods and wireless communication devices, transmitting the primary link information includes transmitting a data frame, a management frame, or a control frame, the data frame, management frame or control frame including an OMI control field that includes the primary link information.

Some implementations of the methods and wireless communication devices further include transmitting flexibility information to the AP, the flexibility information indicating a capability of the wireless communication device to dynamically change the first primary communication link and the second primary communication link.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
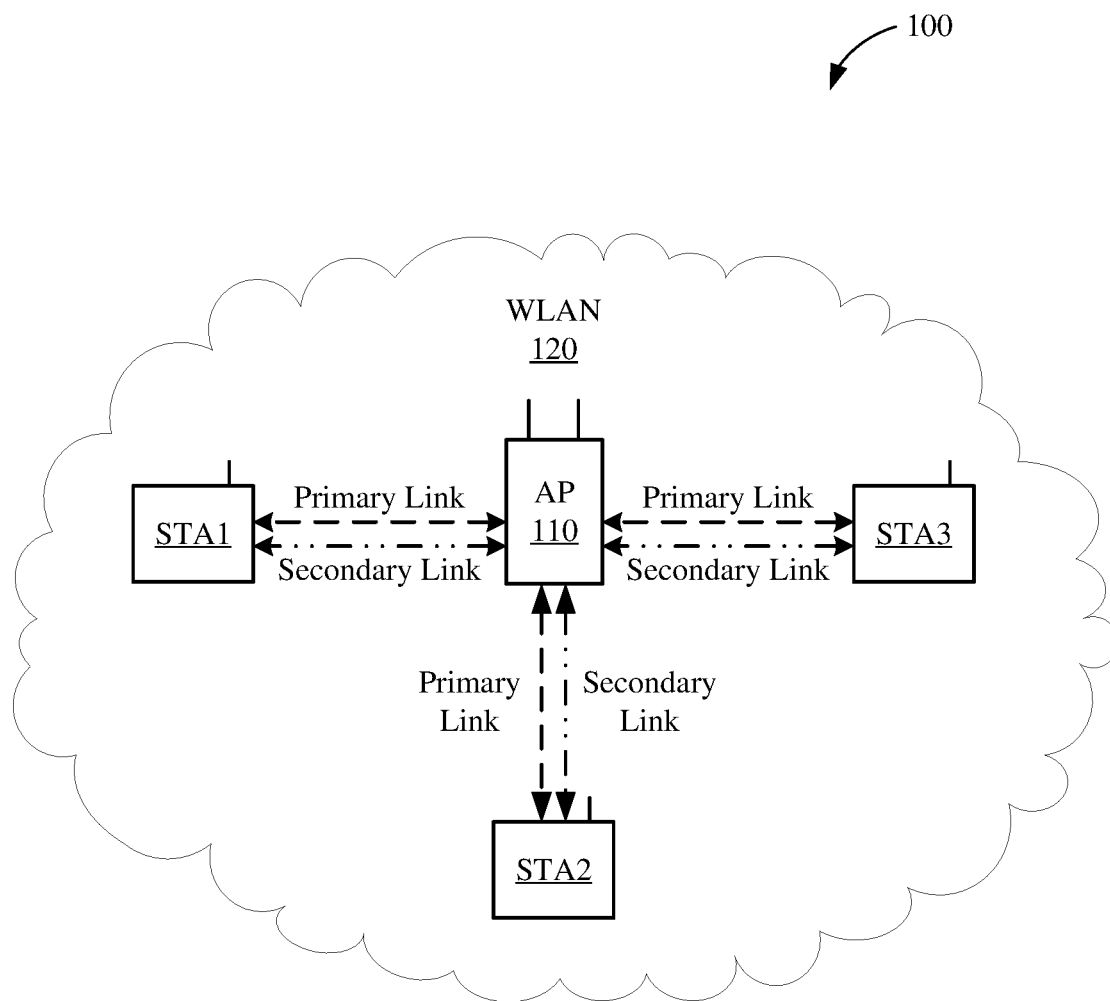
FIG. 1 shows a block diagram of a wireless system.

The following description is directed to certain implementations for the purposes of describing the innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), frequency division multiple access (FDMA), time division multiple access (TDMA), orthogonal frequency division multiple access (OFDMA), single-user (SU) multi-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Link aggregation is a technique that may allow wireless devices to communicate with one another via multiple concurrent communication links. More specifically, link aggregation allows a wireless device to aggregate data transmissions over a primary communication link and one or more secondary communication links, thereby increasing throughput by spreading the transmissions over a wider bandwidth. For example, a wireless device with multiple Media Access Controllers (MACs) may contend for access to the shared wireless medium on multiple communication links, concurrently and independently of one another. However, a wireless device with a single MAC typically contends for access on the primary link, and may use the secondary links only if it gains access to the shared wireless medium on the primary link. Because some wireless devices have only one MAC, the increase in throughput achievable through link aggregation may be limited by the load on the primary link. Thus, the implementations described herein may enable wireless devices in a multi-link environment to dynamically change their primary links depending on the channel conditions in the shared wireless medium.

In some implementations, an access point (AP) may monitor the channel conditions on a primary link and one or more secondary links of a multi-link environment, and may signal a change in the primary link (such as to one of the secondary links) when one or more conditions are met. In some other implementations, the primary and secondary links may be assigned on a per-client basis. For example, each wireless station (STA) may select which wireless channels are to be used for its primary and secondary links with the AP. Thus, the primary or secondary links of a particular STA may be different than those of other STAs associated with the same AP. In some aspects, each STA may monitor the channel conditions on its own primary and secondary links, and may signal a change in its primary link (such as to one of its secondary links) when one or more conditions are met. For example, the change in primary link may be triggered when the amount of traffic or interference on the current primary link exceeds a threshold level, a secondary link has less traffic or interference than the current primary link, or any combination thereof.

Particular implementations of the subject matter described in this disclosure can be implemented to realize one or more of the following potential advantages. The throughput of communications in multi-link environments (such as provided by aggregating a primary link with one or more secondary links) may be improved. For example, by dynamically changing the primary links based at least in part on the channel conditions of the various links, wireless devices may contend for medium access on wireless channels that would otherwise remain idle (or underutilized) as secondary links. This may allow for more optimized usage of the available bandwidth in the shared wireless medium. Furthermore, by allowing each STA to specify (and change) its primary and secondary links on a per-client basis, the available wireless channels may be utilized in a manner that is best-suited for the needs or operating conditions of each individual STA.

In the following description, numerous specific details are set forth such as examples of specific components, circuits, and processes to provide a thorough understanding of the present disclosure. The term "HE" may refer to a high efficiency frame format or protocol defined, for example, by the IEEE 802.11ax specification. Thus, the term "HE AP" may refer to an AP that operates according to the IEEE 802.11ax specification, and the term "HE STA" may refer to STAs that operate according to the IEEE 802.11ax specification.

The term "multi-link" or "ML" may refer to various link aggregation techniques that may be used to aggregate transmissions across multiple communication links. Thus, the term "ML AP" may refer to an AP that is capable of link aggregation, and the term "ML STA" may refer to STAs that are capable of link aggregation. The term "legacy STA" may refer to any STA that does not support link aggregation. The term "primary link" or "primary communication link" may refer to a set or subset of wireless channels on which peer devices (such as a STA and an AP) contend for access to a shared wireless medium. The term "secondary link" or "secondary communication link" may refer to any set or subset of wireless channels that are accessible by the peer devices for purposes of link aggregation.

In addition, although described herein in terms of exchanging data frames between wireless devices, the implementations may be applied to the exchange of any data unit, packet, or frame between wireless devices. Thus, the term "frame" may include any frame, packet, or data unit such as, for example, protocol data units (PDUs), MAC protocol data units (MPDUs), aggregated MPDUs (A-MPDUs), and physical layer convergence procedure protocol data units (PPDUs).

FIG. 1 shows a block diagram of a wireless system 100. The wireless system 100 is shown to include an access point (AP) 110 and a number of wireless stations STA1-STA3. Although only three wireless stations STA1-STA3 are shown in the example of FIG. 1 for simplicity, it is to be understood that the wireless system 100 may include any number of STAs.

The wireless stations STA1-STA3 may include any suitable Wi-Fi enabled wireless device including, for example, a cell phone, personal digital assistant (PDA), tablet device, laptop computer, other user equipment (UE), access terminal (AT) or the like. The AP 110 may be any suitable device that allows one or more wireless devices to connect to a network (such as a local area network (LAN), wide area network (WAN), metropolitan area network (MAN), or the Internet) using Wi-Fi, Bluetooth, or any other suitable wireless communication standards. More specifically, the AP 110 may correspond to, or provide, a basic service set (BSS). A BSS represents a basic building block of a wireless network, and may thus include a single AP (such as AP 110) and one or more associated STAs (such as STA1-STA3). In some implementations, the AP 110 may be any suitable wireless device (such as a wireless STA) acting as a software-enabled access point ("SoftAP"). The AP 110 and stations STA1-STA3 may each include one or more transceivers, one or more processing resources (such as processors or ASICs), one or more memory resources, and a power source.

In some implementations, the AP 110 may be capable of establishing multiple communication links with each of the wireless stations STA1-STA3. For example, the AP 110 may communicate with each of the wireless stations STA1-STA3 via a primary link and one or more secondary links. In the example of FIG. 1, each of the wireless stations STA1-STA3 is shown to have only one secondary link. However, in actual implementations the AP 110 may establish any number of secondary links with any of the wireless stations STA1-STA3. In some implementations, the communication links may encompass different frequency bands. For example, the primary link may comprise one or more channels of the 5 GHz frequency band and the secondary link may comprise one or more channels of the 6 GHz frequency band. In some other implementations, the communication links may encompass different channels of the same frequency band. For example, the primary link may comprise a first subset of channels in the 6 GHz frequency band and the secondary link may comprise a second subset of channels in the 6 GHz frequency band. Still further, in some implementations, the communication links may encompass different channels of different frequency bands. For example, the primary link may comprise a first subset of channels in the 5 GHz frequency band and a first subset of channels in the 6 GHz frequency band, and the secondary link may comprise a second subset of channels in the 5 GHz frequency band and a second subset of channels in the 6 GHz frequency band.

Each of the wireless devices (such as AP 110 and STA1-STA3) may have one or more media access controllers (MACs) that may be used to contend for access to the shared wireless medium. For example, the MAC may implement carrier sense multiple access collision avoidance (CSMA/CA) techniques to listen to the wireless medium to determine when the wireless medium is idle. When the wireless medium has been idle for a given duration, the MAC may contend for medium access (such as by waiting a random "back-off" period before attempting to transmit on the wireless medium). The winning device may be granted exclusive use of the shared wireless medium for a period of time (commonly referred to as a transmit opportunity or TXOP), during which only the winning device may transmit (or receive) data over the shared wireless medium.

A wireless device with multiple MACs (or multiple wireless radios) may contend for medium access on each of the communication links independently. For example, a different MAC may be assigned to each of the different communication links. As used herein, the term "multi-MAC device" may refer to any device that uses multiple MACs to communicate over multiple communication links. In some implementations, the AP 110 may be a multi-MAC device. For example, the AP 110 may include a first MAC configured to access the wireless medium via the primary link and a second MAC configured to access the wireless medium via the secondary link. More specifically, the first MAC may contend for medium access (on the primary link) when the primary link is idle, independent of the traffic conditions on the secondary link. Similarly, the second MAC may contend for medium access (on the secondary link) when the secondary link is idle, independent of the traffic conditions on the primary link. Thus, as long as one of the communications links is idle (such as the primary link or the secondary link), a multi-MAC device may gain access to the shared wireless medium. However, many wireless devices currently have only one MAC.

A wireless device with a single MAC (or a single wireless radio) may contend for medium access on only one of the communication links at any given time. For example, the wireless device may include a wideband radio that can be configured to communicate on each of the primary and secondary links. As described above, each of the primary and secondary links may be of various bandwidths, for example, by bonding a number of 20 MHz-wide channels together to form 40 MHz-wide channels, 80 MHz-wide channels, or 160 MHz-wide channels. It is noted that the next generation of Wi-Fi may allow a 320 MHz-wide channel (by accessing the 6 GHz frequency band), which may allow for link aggregation across multiple secondary channels. Thus, the MAC associated with the wideband radio may be assigned to cover a wide range of frequencies encompassed by the primary link and one or more secondary links. As used herein, the term "single-MAC device" may refer to any device that uses a single MAC to communicate over multiple communication links.

In some implementations, one or more of the wireless stations STA1-STA3 may be a single-MAC device. For example, the single MAC may be configured to contend for medium access on the primary link (such as by waiting a random back-off period before attempting to transmit on an idle channel). However, a single-MAC device may attempt to access the secondary link only after it has gained access to the wireless medium on the primary link. For example, while operating on the primary link, the single-MAC device may check for a signal on the secondary link to determine whether the secondary link is idle. In some aspects, the single-MAC device may use energy detection (ED) or power detection (PD) techniques to sense the level of activity on the secondary link to determine if, and when, link aggregation is possible. If the activity on the secondary link is sufficiently low (such as below a threshold), the single-MAC device may access the secondary link, concurrently with the primary link, to transmit or receive wireless communications using link aggregation techniques. In contrast with the primary link, access to the secondary link is not contention-based. For example, the single-MAC device need not wait a random back-off period (after determining that the secondary link is idle) before attempting to transmit on the secondary link. However, the single-MAC device may use link aggregation only when the primary link and the secondary link are concurrently idle.

In some implementations, each of the wireless devices in the WLAN 120 (including the AP 110 and each of the wireless stations STA1-STA3) may be a single-MAC device. Accordingly, only the primary link may be used to contend for access to the shared wireless medium. In some other implementations, the WLAN 120 may include a combination of multi-MAC devices and single-MAC devices. For example, the AP 110 may be a multi-MAC device (having two or more wireless radios) and the wireless stations STA1-STA3 may be single-MAC devices (having a single wideband radio). As noted above, a multi-MAC device may contend on each of the communication links, independently, and may thus have a competitive advantage over single-MAC devices in obtaining access to the shared wireless medium (via at least one of the communication links). To ensure each of the wireless devices in the WLAN 120 has a fair chance of accessing the shared wireless medium, multi-MAC devices may also be configured to contend for medium access on only the primary link. In some implementations, where the AP 110 is a multi-MAC device, the AP 110 may contend for medium access on only the primary link when attempting to transmit downlink (DL) data. However, when attempting to transmit management and control frames (such as beacons, probe responses, and the like) or responding to uplink (UL) transmissions by a particular STA, the AP 110 may contend for medium access on each of the primary and secondary links separately and concurrently.

Aspects of this disclosure recognize that, because single-MAC devices must contend for medium access on only the primary link, the overall throughput of the WLAN 120 may be limited by the load on the primary link. For example, as long as the primary link is busy (due to ongoing transmissions by a wireless device in the current BSS or an overlapping BSS), no other wireless device may utilize the shared wireless medium even if the secondary link is idle. Thus, to improve the throughput and channel utilization in a multi-link environment, the implementations described herein may dynamically change (or reallocate) the primary link based at least in part on channel conditions on each of the communication links. For example, when the current primary link is heavily loaded (due to heavy traffic or interference on the corresponding channel), and the load on the secondary link is relatively light, the primary and secondary links may switch roles. More specifically, single-MAC devices (and some multi-MAC devices) may contend for medium access on the wireless channels associated with the existing secondary link (now the new primary link), and may utilize the wireless channels associated with the existing primary link (now the new secondary link) for purposes of link aggregation only.

Figure 2:
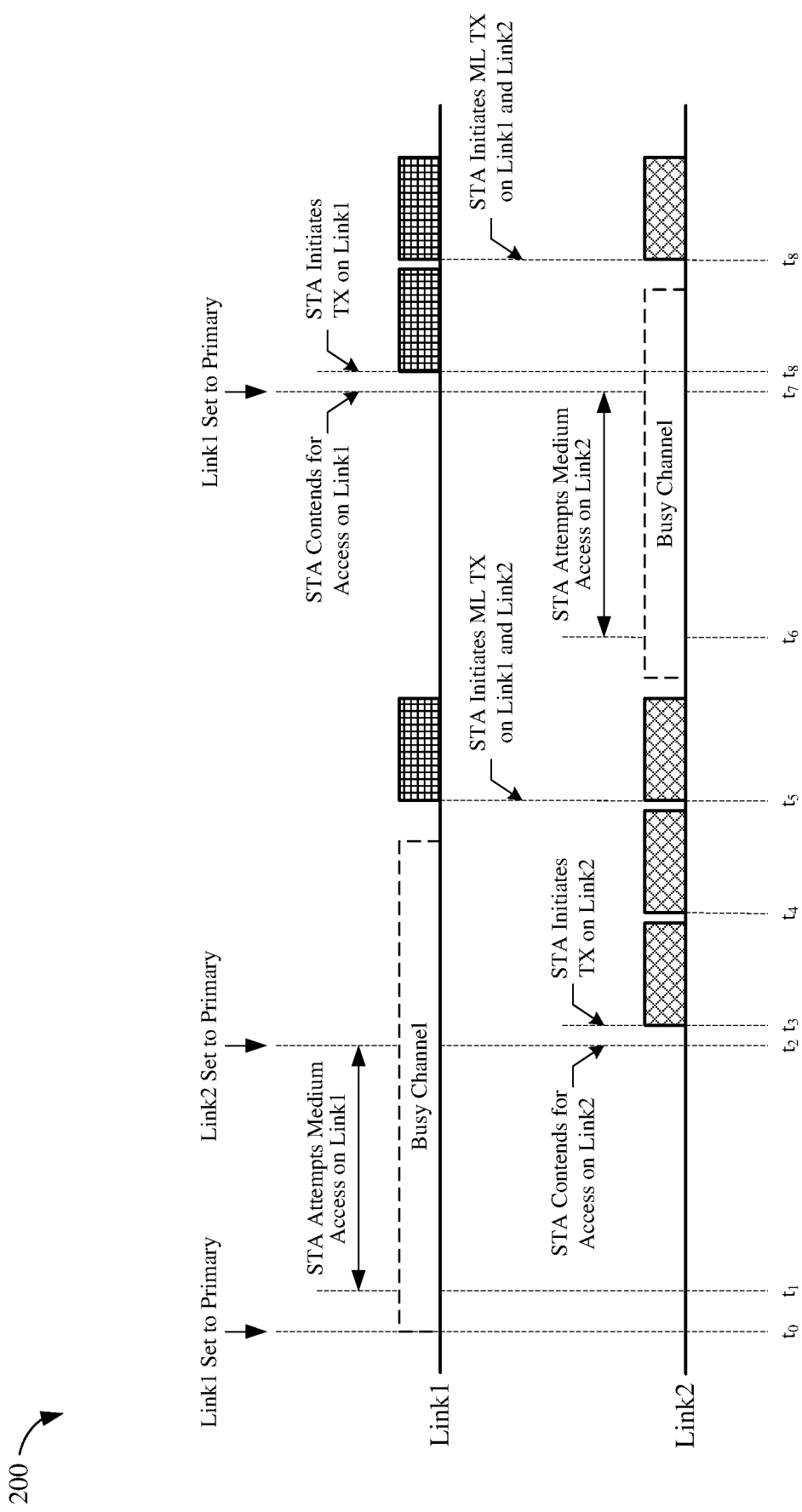
FIG. 2 shows a timing diagram depicting an example multi-link communication.

FIG. 2 shows a timing diagram 200 depicting an example multi-link (ML) communication. For purposes of discussion, the example ML communication may be performed by a STA in a wireless network. With reference for example to the wireless system 100 of FIG. 1, the STA may be one of the wireless stations STA1-STA3. However, in actual implementations, the example ML communication depicted in FIG. 2 may be performed by any of the wireless devices (including the AP 110) in the WLAN 120. In some implementations, the STA may be a single-MAC device that is configured to communicate with an AP via multiple communication links. For example, a first link (Link1) may encompass a first set of channels spanning one or more frequency bands and a second link (Link2) may encompass a second set of channels spanning the same or different frequency bands. Although only two communication links are shown in FIG. 2, it is to be understood that the STA may establish any number of communication links with the AP.

At time $t_0$, Link1 may be configured as the primary link and Link2 may be configured as the secondary link. At time $t_1$, the STA attempts to access the wireless medium. For example, the STA may have UL data to transmit to the AP or another STA in the wireless network. Since Link1 is the primary link, the STA may attempt to access the shared wireless medium via Link1. In the example of FIG. 2, Link1 may be busy when the STA attempts to access the wireless medium at time $t_1$. For example, using energy or power detection techniques, the STA may sense that the energy or power in the wireless channel associated with Link1 exceeds a threshold level. The activity on Link1 may be caused by transmissions from other wireless devices in the vicinity of the STA (such as APs or STAs in the same BSS or an overlapping BSS) or various sources of wireless interference. Since Link1 is busy, the STA may refrain from even contending for access to the shared wireless medium at time $t_1$.

In some implementations, the STA may attempt to access the shared wireless medium for at least a threshold duration (such as from times $t_1$ to $t_2$). For example, the STA may continue monitoring the activity (energy or power) level of Link1, for the threshold duration, to determine whether the communications link is available for medium access. However, in the example of FIG. 2, Link1 remains busy for at least the entirety of the threshold duration. In some implementations, the threshold duration may correspond with the duration of a beacon interval. It is noted that Link2 is idle for the duration in which the STA attempts to access the wireless medium on Link1 (from times $t_1$ to $t_2$). However, because the STA is a single-MAC device and Link2 is a secondary link, the STA may be unable to contend for medium access on Link2. In some implementations, the STA may change or switch its primary link (from Link1 to Link2) if one or more conditions are satisfied when the threshold duration expires. For example, the STA may switch its current primary link with a secondary link if the load (activity or interference) on the primary link is above a threshold level, the load on the secondary link is below a threshold level, the load on the secondary link is less than the load on the primary link, or any combination thereof.

Thus, rather than wait for the current primary link (Link1) to become idle, the STA may change its primary link from Link1 to Link2 at time $t_2$. Upon switching the primary link to Link2, the STA may detect that Link2 is idle and may thus contend for access to the shared wireless medium on Link 2. For example, the STA may wait a random back-off time before initiating a UL transmission (TX) on Link2. In the example of FIG. 2, the STA wins access to the shared wireless medium, at time $t_3$, and is thus able to successfully transmit a frame (or PPDU) of UL data on Link2. While communicating on Link2, the STA may monitor the activity level on Link1 to determine whether the communication link is available for link aggregation. Since Link1 is busy at time $t_3$, the STA may transmit the UL frame only on Link2. At time $t_4$, the STA may transmit another frame of UL data on the shared wireless medium. Since Link1 is still busy at time $t_4$, the STA may again transmit the UL frame only on Link2.

At time $t_5$, the STA may transmit another frame of UL data on the shared wireless medium. At this time, Link1 is no longer busy. Thus, the STA may transmit a frame of UL data on Link2 and another frame of UL data, concurrently, on Link1. For example, the STA may use link aggregation techniques to aggregate the remaining UL data for transmission across the primary link (Link2) and the secondary link (Link1). Upon completion of the multi-link (ML) transmission at time $t_5$, the STA's access to the shared wireless medium may be terminated. For example, the STA may have no more UL data in its queue or the TXOP assigned to the STA may have expired. Accordingly, the STA may relinquish control of Link2 to allow other devices to access the shared wireless medium.

At time $t_6$, the STA may once again attempt to access the shared wireless medium. Since Link2 is the current primary link, the STA may attempt to access the shared wireless medium via Link2. However, in the example of FIG. 2, Link2 may be busy when the STA attempts to access the wireless medium at time $t_6$. For example, using energy or power detection techniques, the STA may sense that the energy or power in the wireless channel associated with Link2 exceeds a threshold level. The activity on Link2 may be caused by transmissions from other wireless devices in the vicinity of the STA (such as APs or STAs in the same BSS or an overlapping BSS) or various sources of wireless interference. Since Link2 is busy, the STA may refrain from contending for access to the shared wireless medium at time $t_6$.

In some implementations, the STA may attempt to access the shared wireless medium for at least a threshold duration (such as from times $t_6$ to $t_7$). However, in the example of FIG. 2, Link2 remains busy for at least the entirety of the threshold duration. It is noted that Link1 is idle for the duration in which the STA attempts to access the wireless medium on Link2 (from times $t_6$ to $t_7$). Thus, in some implementations, the STA may change or switch its primary link (from Link2 to Link1) if one or more conditions are satisfied when the threshold expires. For example, the STA may switch its current primary link with a secondary link if the load on the primary link is above a threshold level, the load on the secondary link is below a threshold level, the load on the secondary link is less than the load on the primary link, or any combination thereof.

Thus, rather than wait for the current primary link (Link2) to become idle, the STA may once again switch its primary link from Link2 back to Link1 at time $t_7$. Upon switching the primary link to Link1, the STA may detect that Link1 is idle and may thus contend for access to the shared wireless medium on Link1. In the example of FIG. 2, the STA wins access to the shared wireless medium, at time $t_8$, and is thus able to successfully transmit a frame (or PPDU) of UL data on Link1. While communicating on Link1, the STA may monitor the activity level on Link2 to determine whether the communication link is available for link aggregation. Since Link2 is busy at time $t_8$, the STA may transmit the UL frame only on Link1. At time $t_9$, the STA may transmit another frame of UL data on the shared wireless medium. At this time, Link2 is no longer busy. Thus, the STA may transmit a frame of UL data on Link1 and another frame of UL data, concurrently, on Link2 (using link aggregation).

In the example ML communication described above, the role of "primary link" is not fixed or permanently assigned to any particular one of the communication links Link1 or Link2. Rather, the primary link may be dynamically changing (switching between Link1 and Link2) based, at least in part, on the channel conditions of the various communication links. By using a "floating" primary link, the STA (and other wireless devices in the network) may adapt to changing channel conditions in the shared wireless medium, for example, to ensure efficient utilization of the available communication links or wireless channels. For example, when the current primary link becomes overloaded (compared to a secondary link), the STA may change or reconfigure its primary link so that a less-loaded communication link becomes the new primary link (such as at times $t_2$ and $t_7$ of FIG. 2). This allows the STA to take advantage of the available resources on the less-loaded communication link to gain access to the shared wireless medium. In contrast, a STA that uses a fixed primary link may have to wait a relatively long time for the primary link to become idle before it can even contend for access to the shared wireless medium.

The decision to switch the primary link with a secondary link may depend on the channel conditions associated with each of the communication links. For example, it may desirable to change the primary link if a secondary link is less busy or underutilized compared to the current primary link. On the other hand, it may not be desirable to change the primary link if the secondary link(s) is even more heavily loaded than the current primary link. In some wireless networks, the AP may have knowledge of the channel conditions on each of the communication links. For example, the AP may monitor the traffic patterns or activity of its associated STAs on each of the primary link and the secondary link. Alternatively, or in addition, the AP may learn the channel conditions on each of the communication links by correlating with past channel conditions on the primary link and the secondary link.

In some implementations, the AP may manage or control the assignment of the primary link in a multi-link environment. For example, the AP may monitor the channel conditions on each of the communication links, and may selectively assign (and re-assign) the role of primary link to one of the communication links based at least in part on the channel conditions associated with each of the communication links. In some aspects, the AP may signal changes in the primary link via beacon frames broadcast at target beacon transmission times (TBTTs). For example, beacon frames are typically broadcast at regular intervals (referred to as "beacon intervals") to enable any STAs in the vicinity of the AP to establish or maintain a connection to the wireless network. Accordingly, most (if not all) STAs in the wireless network may be expected to listen for such beacon frames from the AP at the start of each beacon interval. In some aspects, the AP may dynamically change or reassign the primary link to optimize throughput across the multiple communication links on a per-TBTT basis.

Figure 3A:
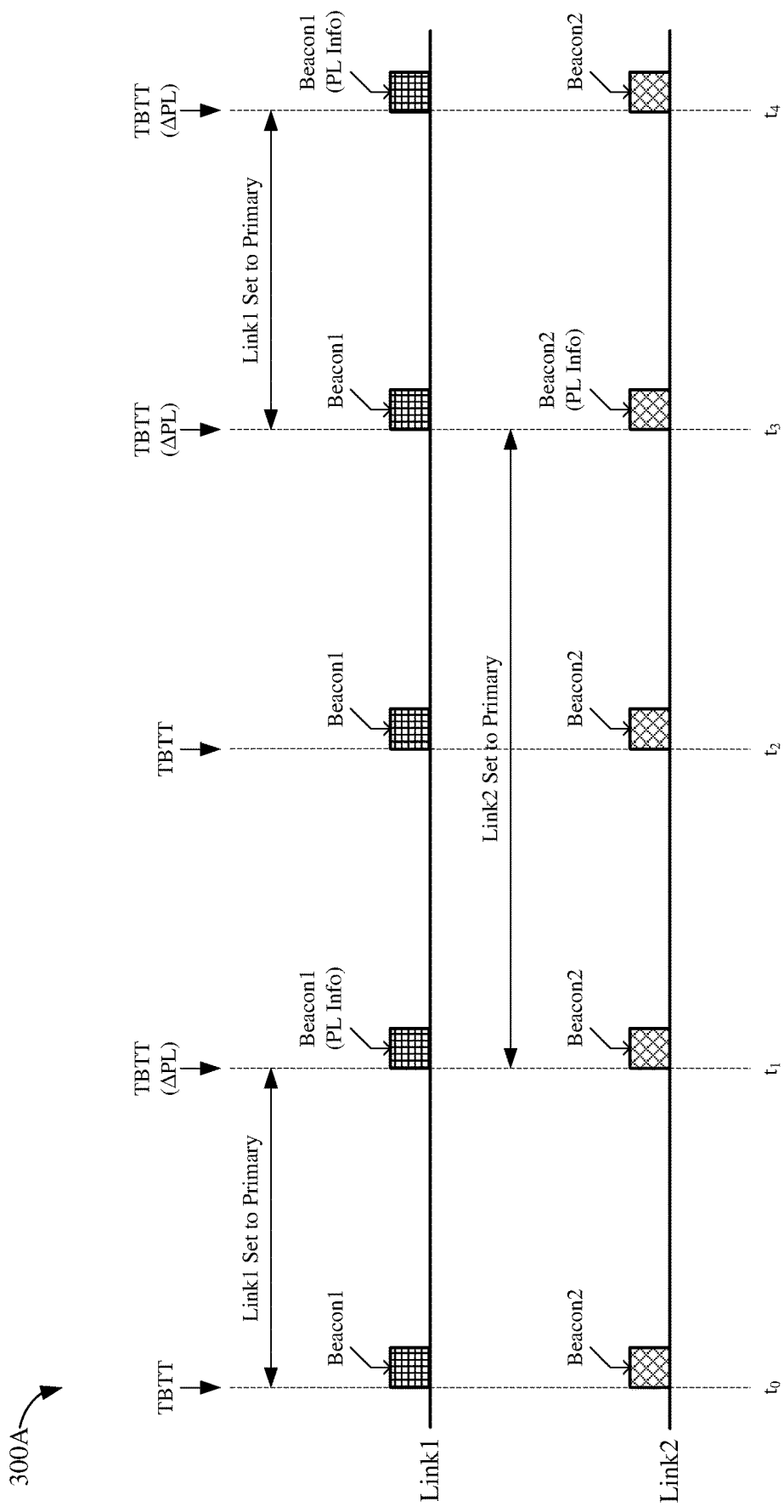
FIGS. 3A and 3B show timing diagrams depicting example operations for changing the primary link in a multi-link environment.

FIG. 3A shows a timing diagram 300A depicting an example operation for changing the primary link in a multi-link environment. The example operation may be performed by an AP in a wireless network such as, for example, the AP 110 of FIG. 1. In some implementations, the AP may be a single-MAC device that uses a single MAC to communicate with one or more associated STAs via multiple communication links. In some other implementations, the AP may be a multi-MAC device that uses multiple MACs to communicate with one or more associated STAs via respective communication links. For example, a first link (Link1) may encompass a first set of channels spanning one or more frequency bands and a second link (Link2) may encompass a second set of channels spanning the same or different frequency bands. Although only two communication links are shown in FIG. 3A, it is to be understood that the AP may establish any number of communication links with its associated STAs.

At time $t_0$, the AP may broadcast respective beacon frames (Beacon1 and Beacon2) on each of the communication links Link1 and Link2. For example, time $t_0$ may coincide with a TBTT or the start of a beacon interval (from times $t_0$ to $t_1$). In some aspects, although not shown for simplicity, the AP may contend for medium access at the start of each beacon interval. During this time, Link1 may be configured as the primary link and Link2 may be configured as the secondary link. Thus, if the AP is a single-MAC device, the AP may contend for medium access on Link1 to broadcast Beacon1 and, upon gaining access to shared wireless medium via Link1, the AP may use link aggregation to broadcast Beacon2 on Link2. On the other hand, if the AP is a multi-MAC device, the AP may contend for medium access on each of the communication links Link1 and Link2, concurrently, and may independently broadcast the beacon frames Beacon1 and Beacon2 upon gaining access to the respective communication links.

It is noted that ML STAs in the wireless network may listen to the primary link (Link1) for beacon frames (Beacon1) broadcast by the AP. However, the AP also may support legacy STAs that may not be capable of ML functionality. More specifically, legacy STAs may not be capable of concurrently communicating over multiple communication links. Thus, legacy STAs may not distinguish between a primary link or secondary link. In some instances, such legacy STAs may be associated with the AP on Link2, and may thus only listen to Link2 for beacon frames (Beacon2) broadcast by the AP. Accordingly, it may be desirable for the AP to broadcast beacon frames on each of the available communication links (including the primary link and any secondary links).

In some implementations, the AP may monitor the channel conditions on each of the communication links Link1 and Link2, for the duration of the beacon interval (from times $t_0$ to $t_1$), to determine whether the quality or throughput of ML communications can be improved by dynamically changing the primary link. More specifically, in determining whether to change the primary link, the AP may consider the load (activity or interference) on Link1 and Link2. For example, it may be desirable to change the primary link if the load on the primary link is above a threshold level, the load on the secondary link is below a threshold level, the load on the secondary link is less than the load on the primary link, or any combination thereof.

At time $t_1$, the AP may switch the primary link from Link1 to Link2. For example, time $t_1$ may coincide with a TBTT or the start of a subsequent beacon interval (from times $t_1$ to $t_2$). Thus, the AP may signal the change in primary link via one or more beacon frames broadcast at the start of the beacon interval. Since Link1 is configured as the primary link at this time (and thus ML STAs are currently listening to Link1 for beacon information), the AP may provide primary link (PL) information in Beacon1, broadcast on Link1, at time $t_1$. For example, the PL information may be provided in a new element or field in the beacon frame that can be interpreted or decoded by ML STAs. In some aspects, the PL information may indicate that the primary link has been changed. In some other aspects (where there are multiple secondary links), the PL information may specify which secondary link is to become the new primary link.

Upon receiving the PL information on Link1, any ML STAs in the wireless network may switch their primary links from Link1 to Link2. Thus, the ML STAs may subsequently listen for beacon frames and contend for medium access on Link2. In some implementations, the AP may include the PL information in other management or control frames (such as probe responses, association responses, reassociation responses, and the like) transmitted to any associated STAs after the change in primary link occurs at time $t_1$. For example, the AP may signal the current primary link (Link2) to any STAs that may have recently joined the wireless network or otherwise missed Beacon1 broadcast at time $t_1$. In some implementations, the AP may continue to monitor the channel conditions on each of the communication links Link1 and Link2, for the duration of the beacon interval (from times $t_1$ to $t_2$), to determine whether the quality or throughput of ML communications can be improved by dynamically changing the primary link.

At time $t_2$, coinciding with the next TBTT, the AP may decide to maintain the primary link on Link2. For example, the AP may determine that the quality or throughput of communications would not be improved by switching the primary link back to Link1. Thus, the AP may broadcast respective beacon frames Beacon1 and Beacon2 on each of the communication links Link1 and Link2, at time $t_2$, without signaling a change in primary link. It is noted that Link2 is now configured as the primary link and Link1 is now configured as the secondary link. Thus, if the AP is a single-MAC device, the AP may contend for medium access on Link2 to broadcast Beacon2 and, upon gaining access to the shared wireless medium via Link2, the AP may use link aggregation to broadcast Beacon1 on Link1. On the other hand, if the AP is a multi-MAC device, the AP may contend for medium access on each of the communication links Link1 and Link2, concurrently, and may independently broadcast the beacon frames Beacon1 and Beacon2 upon gaining access to the respective communication links.

At time $t_3$, coinciding with the next TBTT, the AP may switch the primary link from Link2 back to Link1. For example, the AP may signal the change in primary link via one or more beacon frames broadcast at the start of the beacon interval. Since Link2 is configured as the primary link at this time (and thus ML STAs are currently listening to Link2 for beacon information), the AP may provide PL information in Beacon2, broadcast on Link2, at time $t_3$. As described above, the PL information may indicate that the primary link has changed or may specify which secondary link is to become the new primary link. Upon receiving the PL information on Link2, any ML STAs in the wireless network may switch their primary links from Link2 back to Link1. Thus, the ML STAs may subsequently listen for beacon frames and contend for medium access on Link1. In some implementations, the AP also may change the PL information in other management or control frames transmitted to any associated STAs after the change in primary link occurs at time $t_1$.

At time $t_4$, coinciding with the next TBTT, the AP may once again switch the primary link from Link1 to Link2. Since Link1 is configured as the primary link at this time, the AP may provide PL information in Beacon1, broadcast on Link1, at time $t_4$. As described above, the PL information may indicate that the primary link has changed or may specify which secondary link is to become the new primary link. Upon receiving the PL information on Link1, any ML STAs in the wireless network may switch their primary links from Link1 to Link2. Thus, the ML STAs may subsequently listen for beacon frames and contend for medium access on Link2. In some implementations, the AP also may change the PL information in other management or control frames transmitted to any associated STAs after the change in primary link occurs at time $t_4$.

As shown in FIG. 3A, the example implementations may enable the AP to change the primary link used in ML communications as often as every beacon interval, depending on the current channel conditions. It is noted, however, that some associated ML STAs may be in a power save (PS) state or may otherwise fail to receive the PL information signaled in a beacon frame (due to interference or service interruptions). For example, an ML STA with its primary link set to Link1 may be in a power save state when Beacon1 (carrying the PL information) is broadcast at time $t_1$. As a result, if the ML STA wakes up thereafter (between times $t_1$ and $t_3$), the ML STA may continue attempting to access the shared wireless medium via Link1 (and thus experience relatively poor performance) even though the primary link has been switched to Link2. This may result in inefficient use of the shared wireless medium. Thus, in some implementations, the AP may specify the current primary link via beacon frames broadcast on each of the communication links at the start of each beacon interval.

Figure 3B:
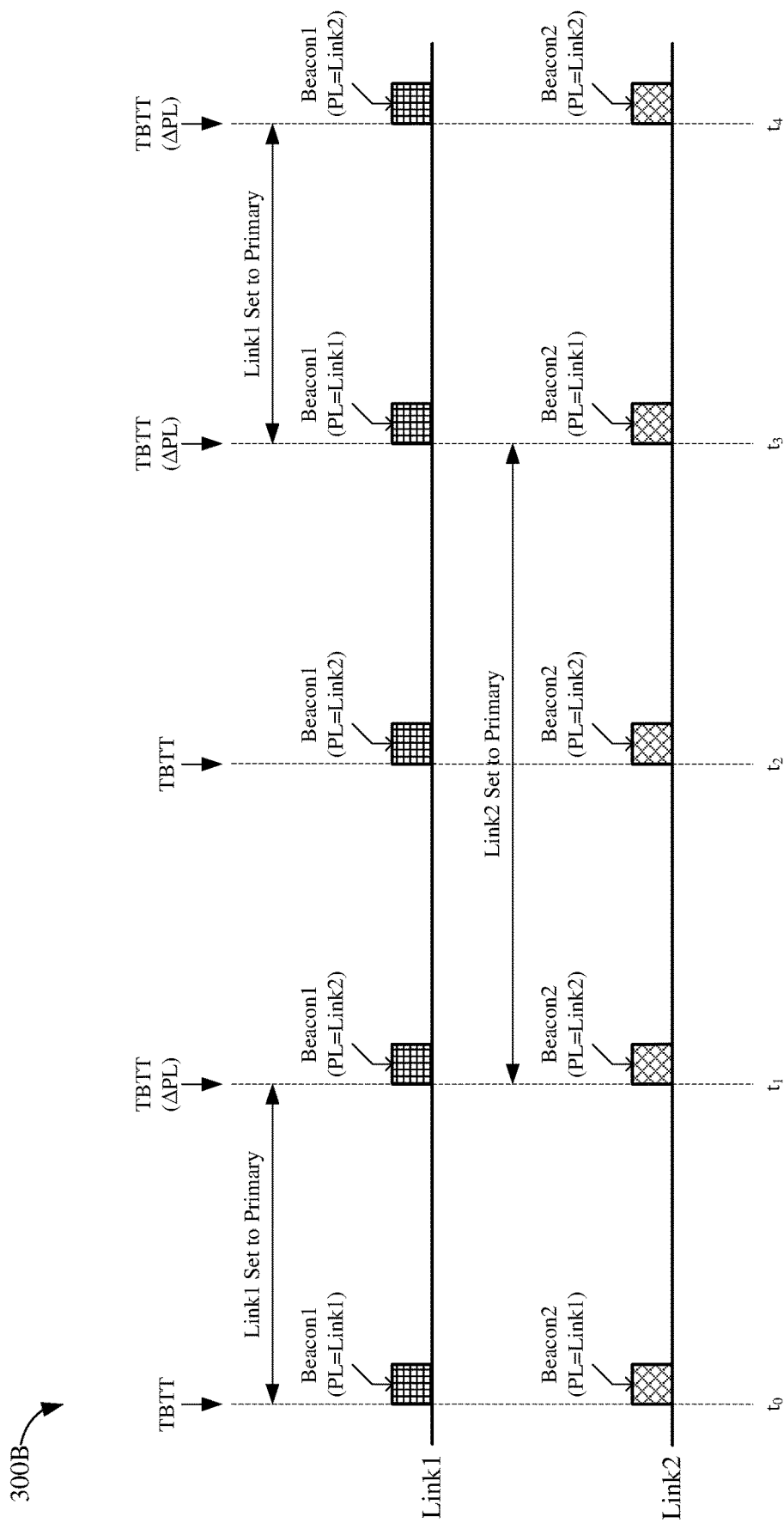

FIG. 3B shows a timing diagram 300B depicting another example operation for changing the primary link in a multi-link environment. The example operation may be performed by an AP in a wireless network such as, for example, the AP 110 of FIG. 1. In some implementations, the AP may be a single-MAC device that uses a single MAC to communicate with one or more associated STAs via multiple communication links. In some other implementations, the AP may be a multi-MAC device that uses multiple MACs to communicate with one or more associated STAs via respective communication links. For example, a first link (Link1) may encompass a first set of channels spanning one or more frequency bands and a second link (Link2) may encompass a second set of channels spanning the same or different frequency bands. Although only two communication links are shown in FIG. 3B, it is to be understood that the AP may establish any number of communication link with its associated STAs.

At time $t_0$, the AP may broadcast respective beacon frames (Beacon1 and Beacon2) on each of the communication links Link1 and Link2. For example, time $t_0$ may coincide with a TBTT or the start of a beacon interval (from times $t_0$ to $t_1$). In some implementations, the AP may provide primary link (PL) information indicating the current primary link (Link1) in one or more beacon frames broadcast at the start of the beacon interval. For example, the PL information may be included as a new element or field in each beacon frame that can be interpreted or decoded by ML STAs. In some aspects, the AP may include the PL information in the beacon frames broadcast on each of the communication links Link1 and Link2. More specifically, Beacon1 and Beacon2 may each include PL information specifying Link1 as the current primary link.

Any ML STAs receiving the PL information via Beacon1 may continue using Link1 as their primary link, and any ML STAs receiving the PL information via Beacon2 may switch their current primary link from Link2 to Link1. In some implementations, the AP may include the PL information in other management or control frames (such as probe responses, association response, reassociation responses, and the like) transmitted to any associated STAs, for example, to signal the current primary link (Link1) to any STAs that may have recently joined the wireless network or otherwise missed the beacons broadcast at time $t_1$. In some implementations, the AP may monitor the channel conditions on each of the communication links Link1 and Link2, for the duration of the beacon interval (from times $t_0$ to $t_1$), to determine whether the quality or throughput of ML communications can be improved by dynamically changing the primary link.

At time $t_1$, the AP may switch the primary link from Link1 to Link2. For example, the AP may determine that the quality or throughput of communications would be improved by switching the primary link to Link2. In some implementations, the AP may signal the change in primary link using the PL information included in each of the beacon frames Beacon1 and Beacon2 broadcast at time $t_1$. For example, the PL information may specify a new communication link (Link2) as the current primary link. In some aspects, the AP may include the PL information in the beacon frames broadcast on each of the communication links Link1 and Link2. More specifically, Beacon1 and Beacon2 may each include PL information specifying Link2 as the current primary link. Any ML STAs receiving the PL information via Beacon1 may switch their current primary link from Link1 to Link2, and any ML STAs receiving the PL information via Beacon2 may continue using Link2 as their current primary link.

At time $t_2$, the AP may decide to maintain the primary link on Link2. For example, the AP may determine that the quality or throughput of communications would not be improved by switching the primary link back to Link1. In some implementations, although the primary link does not change, the AP may continue to provide PL information indicating the current primary link (Link2) in each of the beacon frames Beacon1 and Beacon2 broadcast at time $t_2$. This may allow any ML STAs that may have missed the beacons broadcast at time $t_1$ to be notified of the change in primary link. For example, an ML STA with its primary link set to Link1 may have missed Beacon1 (carrying the PL information) at time $t_1$. As a result, the ML STA may subsequently attempt to access the shared wireless medium via Link1 for the duration of the beacon interval (from times $t_1$ to $t_2$). However, by indicating the current primary link in each of the beacon frames Beacon1 and Beacon2 broadcast at the start of each beacon interval, the ML STA may be notified of the change in primary link upon receiving Beacon1, at time $t_2$, and may thus switch its primary link to Link2 for at least the duration of the next beacon interval (from times $t_2$ to $t_3$).

At time $t_3$, the AP may switch the primary link from Link2 back to Link1. For example, the AP may signal the change in primary link using the PL information included in each of the beacon frames Beacon1 and Beacon2 broadcast at time $t_3$. More specifically, the PL information may specify a new communication link (Link1) as the current primary link. In some aspects, Beacon1 and Beacon2 may each include PL information specifying Link1 as the current primary link. Any ML STAs receiving the PL information via Beacon1 may continue using Link1 as their primary link, and any ML STAs receiving the PL information via Beacon2 may switch their current primary link from Link2 to Link1.

At time $t_4$, the AP may once again switch the primary link from Link1 to Link2. For example, the AP may signal the change in primary link using the PL information included in each of the beacon frames Beacon1 and Beacon2 broadcast at time $t_4$. More specifically, the PL information may specify a new communication link (Link2) as the current primary link. In some aspects, Beacon1 and Beacon2 may each include PL information specifying Link2 as the current primary link. Any ML STAs receiving the PL information via Beacon1 may switch their current primary link from Link1 to Link2, and any ML STAs receiving the PL information via Beacon2 may continue using Link2 as their primary link.

Figure 4A:
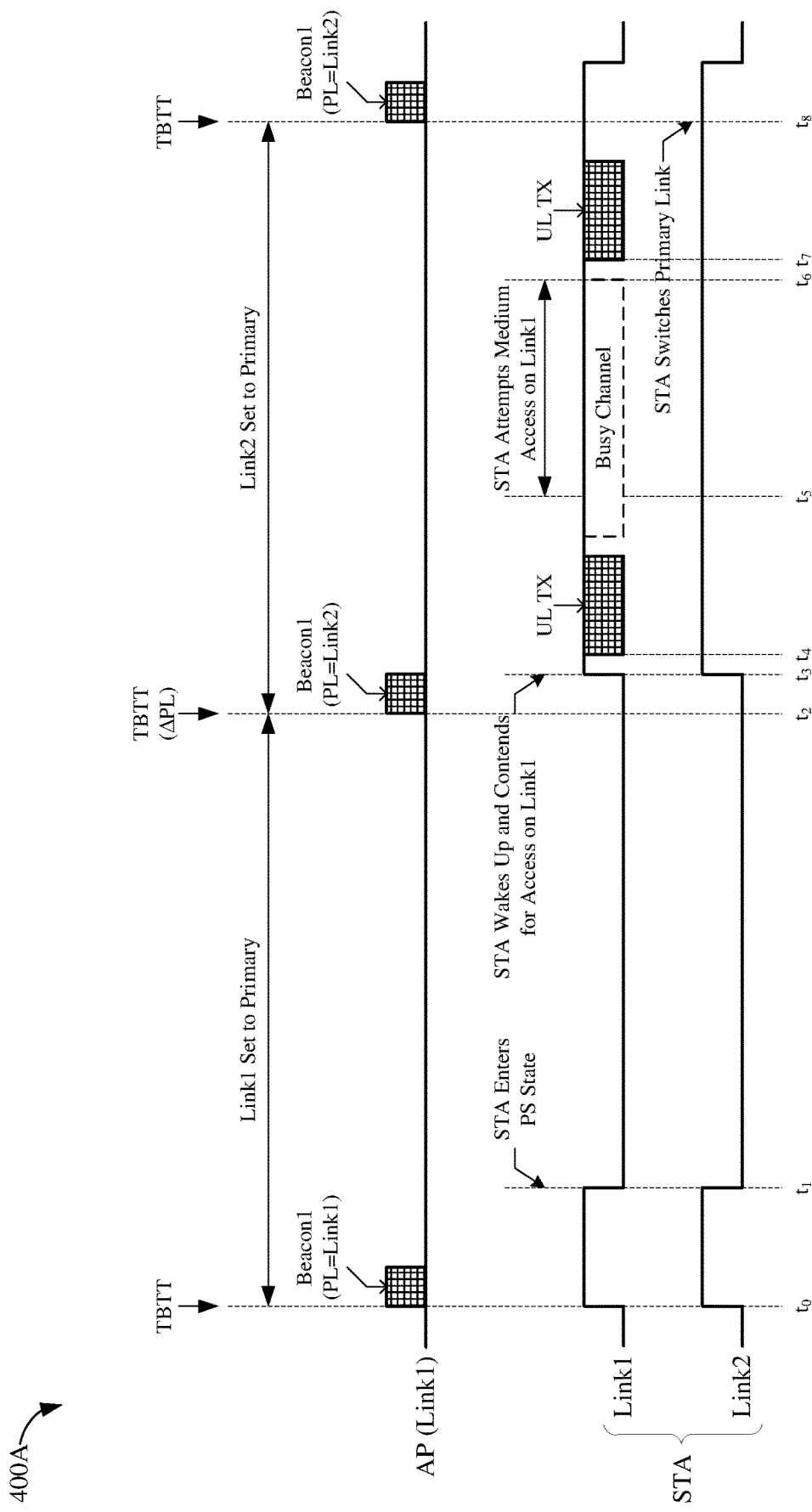
FIGS. 4A-4C show timing diagrams depicting example operations for notifying a wireless station (STA) of a primary link change.

FIG. 4A shows a timing diagram 400A depicting an example operation for notifying a STA of a primary link change. The example operation may be performed during ML communications between an AP and a STA. With reference for example to FIG. 1, the AP may correspond to AP 110 and the STA may correspond to any one of the wireless stations STA1-STA3. In some implementations, the STA may be a single-MAC device that is configured to communicate with the AP via multiple communication links. Although only two communication links (Link1 and Link2) are shown in FIG. 4A, it is to be understood that the STA may establish any number of communication links with the AP. For simplicity, only the AP's activity on Link1 is shown in example of FIG. 4A.

At time $t_0$, Link1 may be configured as the primary link and Link2 may be configured as the secondary link. Furthermore, time $t_0$ may coincide with a TBTT or the start of a beacon interval (from times $t_0$ to $t_2$). Thus, the AP may broadcast a beacon frame (Beacon1) on Link1 at time $t_0$. In some implementations, Beacon1 may include PL information specifying Link1 as the current primary link. The STA may already be configured to utilize Link1 as its current primary link. Thus, the STA may receive Beacon1 on Link1 and continue utilizing Link1 as its primary link. In the example of FIG. 4A, the STA may enter a power save (PS) state, at time $t_1$, after receiving the PL information specifying Link1 as the primary link.

At time $t_2$, the AP may switch the primary link from Link1 to Link2. For example, the AP may determine that the quality or throughput of communications would be improved by switching the primary link to Link2. In some implementations, the AP may signal the change in primary link using the PL information included in Beacon1 broadcast at time $t_2$. For example, the PL information may specify a new communication link (Link2) as the current primary link. In the example of FIG. 4A, the STA is still in a power save state when the AP broadcasts Beacon1, at time $t_2$, and may thus be unaware of the change in primary link.

At time $t_3$, the STA wakes up from the power save state and attempts to access the shared wireless medium. Since the STA is unaware that the primary link has been changed to Link2, STA may sense that Link1 is idle and contend for medium access on Link1. Upon gaining access to the shared wireless medium, at time $t_4$, the STA may transmit a frame of UL data on Link1. In the example of FIG. 4A, the STA may not have any additional UL data to transmit, and may thus relinquish control of the shared wireless medium after transmitting the single frame of UL data.

At time $t_5$, the STA may attempt to access the shared wireless medium once again on Link1. However, at this time Link1 is busy. For example, using energy or power detection techniques, the STA may sense that the energy or power in the wireless channel associated with Link1 exceeds a threshold level. The activity on Link1 may be caused by transmission from other wireless devices in the vicinity of the STA (such as APs or STAs in the same BSS or an overlapping BSS) or various sources of wireless interference. Since Link1 is busy, the STA may refrain from even contending for access to the shared wireless medium at time $t_5$.

In the example of FIG. 4A, the STA may continue monitoring the activity level of Link1, from times $t_5$ to $t_6$, to determine whether the communications link is available for medium access. Then, at time $t_6$, the STA may detect that Link1 is idle and once again contend for medium access on Link1. Upon gaining access to the shared wireless medium, at time $t_7$, the STA may transmit a frame of UL data on Link1. In the example of FIG. 4A, the STA may not have enough time to transmit any additional frames of UL data before the start of the next beacon interval (when the AP is expected to broadcast beacon frames), and may thus relinquish control of the shared wireless medium after transmitting the single frame of UL data.

At time $t_8$, the AP may broadcast another beacon frame (Beacon1) on Link1. In the example of FIG. 4A, the AP may decide to maintain the primary link on Link2. For example, the AP may determine that the quality or throughput of communications would not be improved by switching the primary link back to Link1. In some implementations, even though the primary link does not change, the AP may continue to provide PL information indicating the current primary link (Link2) in Beacon1 broadcast at time $t_8$. Since the STA is awake at this time, the STA may receive Beacon1 from the AP and subsequently switch its primary link from Link1 to Link2.

In the example of FIG. 4A, the STA must wait the majority of a beacon interval (from times $t_3$ to $t_8$) until it is able to switch its primary link from Link1 to Link2. Moreover, a significant portion of that time (from times $t_3$ to $t_8$) is spent monitoring the busy channel conditions on Link1. Thus, it may be desirable to implement a more efficient mechanism for signaling a change in primary link to any associated STAs that may have missed one or more beacon frames.

Figure 4B:
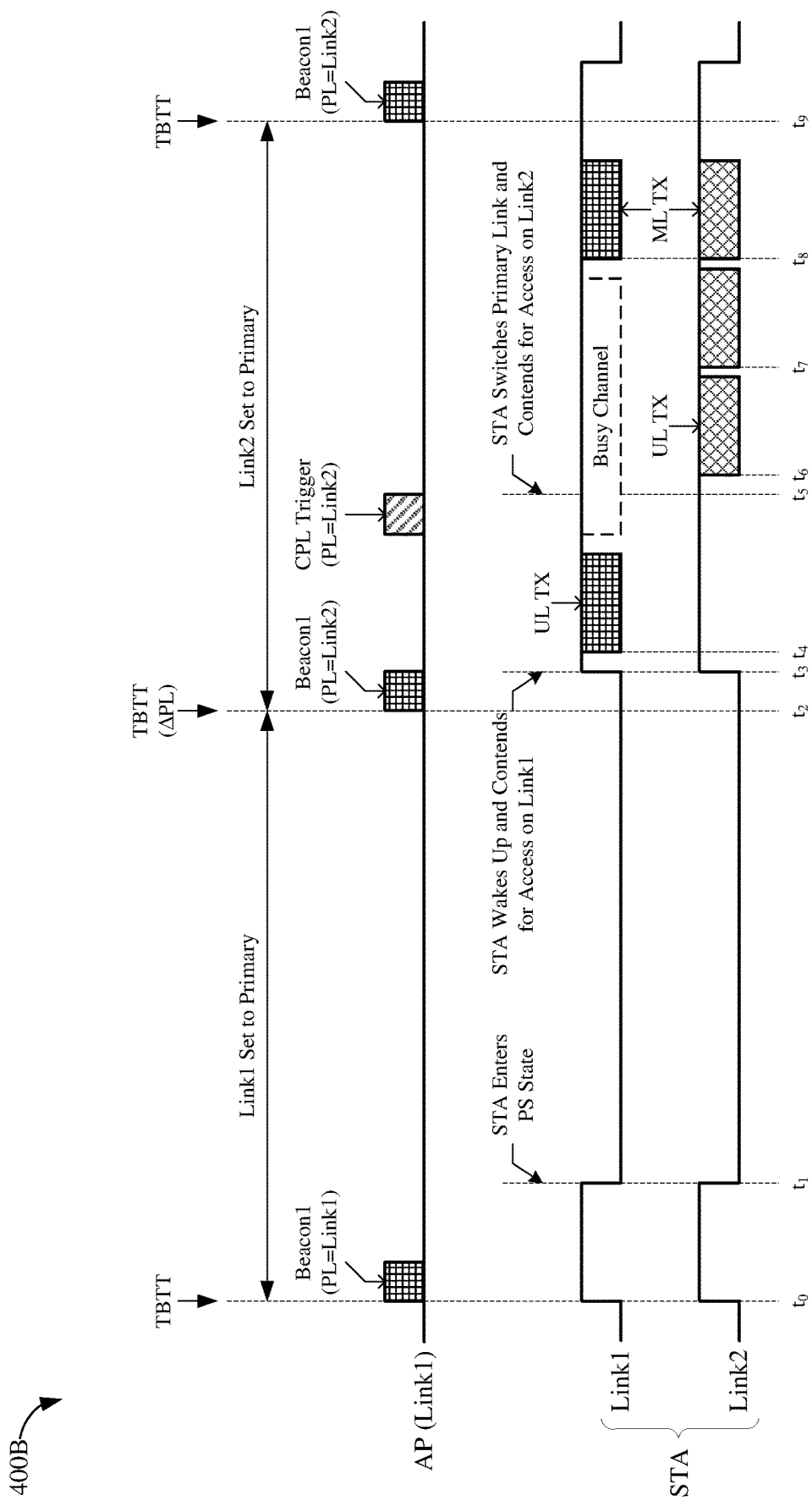

FIG. 4B shows a timing diagram 400B depicting another example operation for notifying a STA of a primary link change. The example operation may be performed during ML communications between an AP and a STA. With reference for example to FIG. 1, the AP may correspond to AP 110 and the STA may correspond to any one of the wireless stations STA1-STA3. In some implementations, the STA may be a single-MAC device that is configured to communicate with the AP via multiple communication links. Although only two communication links (Link1 and Link2) are shown in FIG. 4B, it is to be understood that the STA may establish any number of communication links with the AP. For simplicity, only the AP's activity on Link1 is shown in the example of FIG. 4B.

At time $t_0$, Link1 may be configured as the primary link and Link2 may be configured as the secondary link. Furthermore, time $t_0$ may coincide with a TBTT or the start of a beacon interval (from times $t_0$ to $t_2$). Thus, the AP may broadcast a beacon frame (Beacon1) on Link1 at time $t_0$. In some implementations, Beacon1 may include PL information specifying Link1 as the current primary link. The STA may already be configured to utilize Link1 as its current primary link. Thus, the STA may receive Beacon1 on Link1 and continue utilizing Link1 as its primary link. In the example of FIG. 4B, the STA may enter a power save (PS) state, at time $t_1$, after receiving the PL information specifying Link1 as the primary link.

At time $t_2$, the AP may switch the primary link from Link1 to Link2. For example, the AP may determine that the quality or throughput of communications would be improved by switching the primary link to Link2. In some implementations, the AP may signal the change in primary link using the PL information included in Beacon1 broadcast at time $t_2$. For example, the PL information may specify a new communication link (Link2) as the current primary link. In the example of FIG. 4B, the STA is still in a power save state when the AP broadcasts Beacon1, at time $t_2$, and may thus be unaware of the change in primary link.

At time $t_3$, the STA wakes up from the power save state and attempts to access the shared wireless medium. Since the STA is unaware that the primary link has been changed to Link2, the STA may sense that Link1 is idle and contend for medium access on Link1. Upon gaining access to the shared wireless medium, at time $t_4$, the STA may transmit a frame of UL data via the shared wireless medium. In the example of FIG. 4B, the STA may not have any additional UL data to transmit, and may thus relinquish control of the shared wireless medium after transmitting the single frame of UL data.

In some implementations, the AP may respond to the UL transmission with a change-in-primary-link (CPL) trigger message. The CPL trigger message may include PL information specifying the current primary link (Link2). In some aspects, the CPL trigger message may be signaled using Operating Mode Indication (OMI) procedures defined by the IEEE 802.11ax specification. For example, data frames encoded in accordance with the HE frame format may include an OMI control field (provided in an HE Control element) that may indicate changes to one or more operating parameters for wireless communications between the transmitting device and the receiving device. When the AP receives an HE data frame from the STA, the AP may send a response frame (such as a QoS Null frame) having an OMI control field indicating the change in primary link. Thus, the PL information (specifying Link2 as the current primary link) may be included in the OMI control field of the response frame transmitted by AP. In some implementations, the STA may be configured to initiate a UL transmission upon waking up from a power save state (even if it has no UL data to send) to elicit an OMI response from the AP. For example, the STA may send a PS Poll request to the AP upon waking up from a power save state, and the AP may respond with a QoS Null frame with an OMI control field indicating the change in primary link.

Upon receiving the CPL trigger message on Link1, the STA may subsequently switch its primary link from Link1 to Link2. Then, at time $t_5$, the STA may attempt to access the shared wireless medium on Link2. The STA may sense that Link2 is idle and contend for medium access on Link2. Upon gaining access to the shared wireless medium, at time $t_6$, the STA may transmit another frame of UL data via the shared wireless medium. In the example of FIG. 4B, Link1 is busy at time $t_6$. Thus, the STA may transmit the UL frame only on Link2. At time $t_7$, the STA may transmit another frame of UL data via the shared wireless medium. Since Link1 is still busy at time $t_7$, the STA may again transmit the UL frame only on Link2.

At time $t_8$, the STA may transmit another frame of UL data on the shared wireless medium. At this time, Link1 is no longer busy. Thus, the STA may transmit a frame of UL data on Link2 and another frame of UL data, concurrently, on Link1. For example, the STA may use link aggregation techniques to aggregate multiple frames of UL data for transmission across the primary link (Link2) and the secondary link (Link1). In the example of FIG. 4B, the STA may not have enough time to transmit any additional frames of UL data before the start of the next beacon interval (when the AP is expected to broadcast beacon frames). Thus, the STA may relinquish control of the shared wireless medium upon completion of the multi-link (ML) transmission.

At time $t_9$, the AP may broadcast another beacon frame (Beacon1) on Link1. In the example of FIG. 4B, the AP may decide to maintain the primary link on Link2. For example, the AP may determine that the quality or throughput of communications would not be improved by switching the primary link back to Link1. In some implementations, even though the primary link does not change, the AP may continue to provide PL information indicating the current primary link (Link2) in Beacon1 broadcast at time $t_9$. Since the STA has already switched its primary link to Link2, the STA may not receive Beacon 1 on Link1. Rather, the STA may continue utilizing Link2 as its primary link.

Figure 4C:
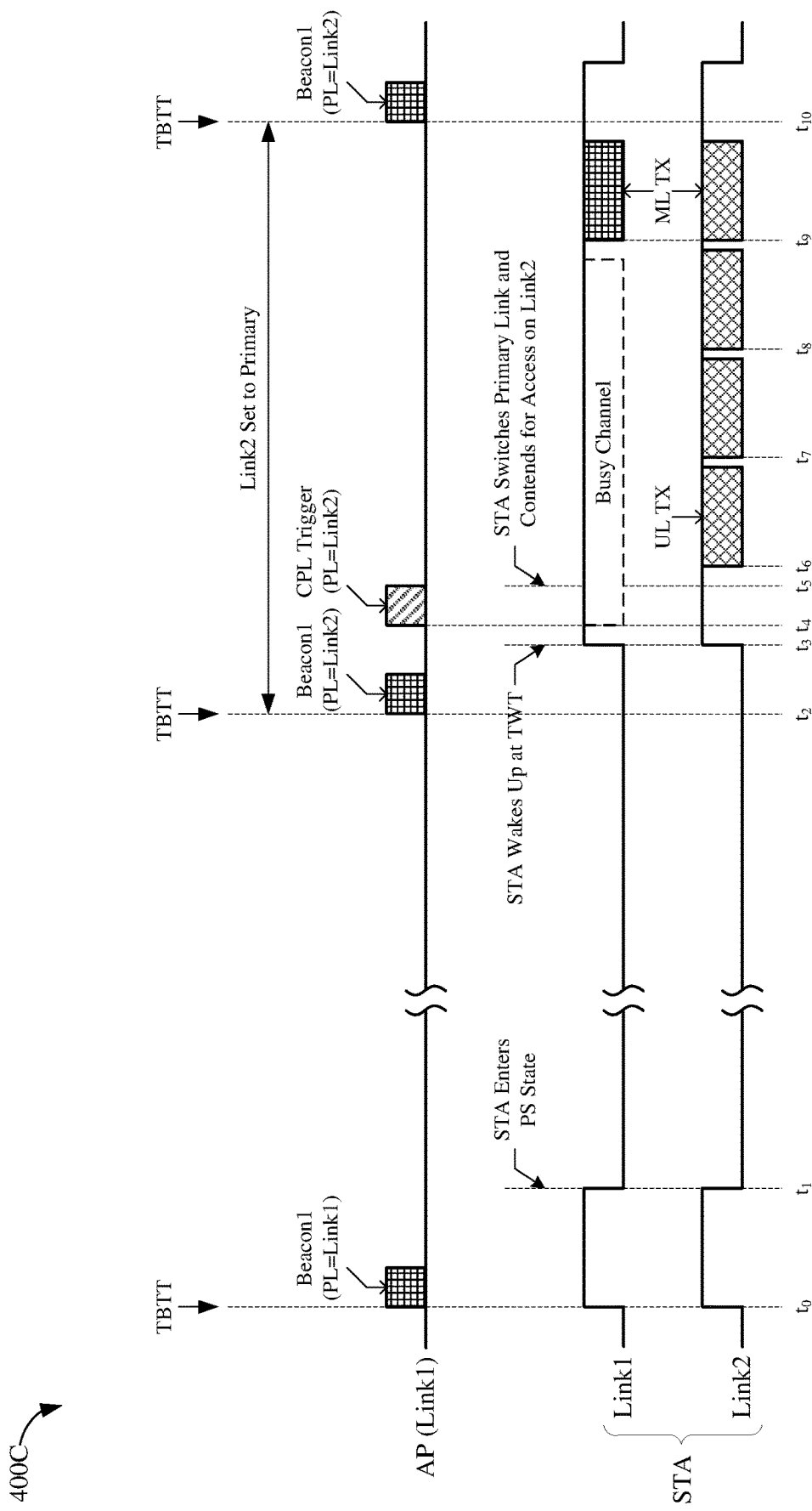

FIG. 4C shows a timing diagram 400C depicting another example operation for notifying a STA of a primary link change. The example operation may be performed during ML communications between an AP and a STA. With reference for example to FIG. 1, the AP may correspond to AP 110 and the STA may correspond to any one of the wireless stations STA1-STA3. In some implementations, the STA may be a single-MAC device that is configured to communicate with the AP via multiple communication links. Although only two communication links (Link1 and Link2) are shown in FIG. 4C, it is to be understood that the STA may establish any number of communication links with the AP. For simplicity, only the AP's activity on Link1 is shown in the example of FIG. 4C.

At time $t_0$, Link1 may be configured as the primary link and Link2 may be configured as the secondary link. Furthermore, time $t_0$ may coincide with a TBTT or the start of a beacon interval (from times $t_0$ to $t_2$). Thus, the AP may broadcast a beacon frame (Beacon1) on Link1 at time $t_0$. In some implementations, Beacon1 may include PL information specifying Link1 as the current primary link. The STA may already be configured to utilize Link1 as its current primary link. Thus, the STA may receive Beacon1 on Link1 and continue utilizing Link1 as its primary link. In some implementations, Beacon1 may further include a Target Wake Time (TWT) element specifying a TWT service period for the STA. For example, a STA operating in a TWT mode may remain in a power save state for relatively long durations (such as one or more beacon intervals), waking up only during its assigned TWT service periods. Thus, the STA may enter a power save state, at time $t_1$, after receiving the PL information specifying Link1 as the primary link.

At time $t_2$, the AP may switch the primary link from Link1 to Link2. For example, the AP may determine that the quality or throughput of communications would be improved by switching the primary link to Link2. In some implementations, the AP may signal the change in primary link using the PL information included in Beacon1 broadcast at time $t_2$. For example, the PL information may specify a new communication link (Link2) as the current primary link. In the example of FIG. 4C, the STA is still in a power save state when the AP broadcasts Beacon1, at time $t_2$, and may thus be unaware of the change in primary link.

At time $t_3$, the STA wakes up at its scheduled TWT. In some implementations, the AP may be aware of the STA's TWT schedule and may thus transmit a CPL trigger message to the STA, at time $t_4$, once the STA wakes up from its power save state. The CPL trigger message may include PL information specifying the current primary link (Link2). In some implementations, the CPL trigger message may be provided in a probe response or action frame (or other management or control frame) transmitted at the start of the TWT service period to notify the STA of the current primary link. In some aspects, the CPL trigger message may be signaled on each of the communication links (Link1 and Link2) to ensure that the STA receives the PL information regardless of its current primary link.

Upon receiving the CPL trigger message on Link1, the STA may subsequently switch its primary link from Link1 to Link2. Then, at time $t_5$, the STA may attempt to access the shared wireless medium on Link2. The STA may sense that Link2 is idle and contend for medium access on Link2. Upon gaining access to the shared wireless medium, at time $t_6$, the STA may transmit a frame of UL data via the shared wireless medium. In the example of FIG. 4C, Link1 is busy at time $t_6$. Thus, the STA may transmit the UL frame only on Link2. At times $t_7$ and $t_8$, the STA may transmit additional frames of UL data via the shared wireless medium. Since Link1 remains busy throughout this period (times $t_7$ and $t_8$) the STA may again transmit the UL frames only on Link2.

At time $t_9$, the STA may transmit another frame of UL data on the shared wireless medium. At this time, Link1 is no longer busy. Thus, the STA may transmit a frame of UL data on Link2 and another frame of UL data, concurrently, on Link1. For example, the STA may use link aggregation techniques to aggregate multiple frames of UL data for transmission across the primary link (Link2) and the secondary link (Link1). In the example of FIG. 4C, the STA may not have enough time to transmit any additional frames of UL data before the start of the next beacon interval (when the AP is expected to broadcast beacon frames). Thus, the STA may relinquish control of the shared wireless medium upon completion of the multi-link (ML) transmission.

At time $t_{10}$, the AP may broadcast another beacon frame (Beacon1) on Link1. In the example of FIG. 4C, the AP may decide to maintain the primary link on Link2. For example, the AP may determine that the quality or throughput of communications would not be improved by switching the primary link back to Link1. In some implementations, even though the primary link does not change, the AP may continue to provide PL information indicating the current primary link (Link2) in Beacon1 broadcast at time $t_{10}$. Since the STA has already switched its primary link to Link2, the STA may not receive Beacon 1 on Link1. Rather, the STA may continue utilizing Link2 as its primary link.

Figure 5:
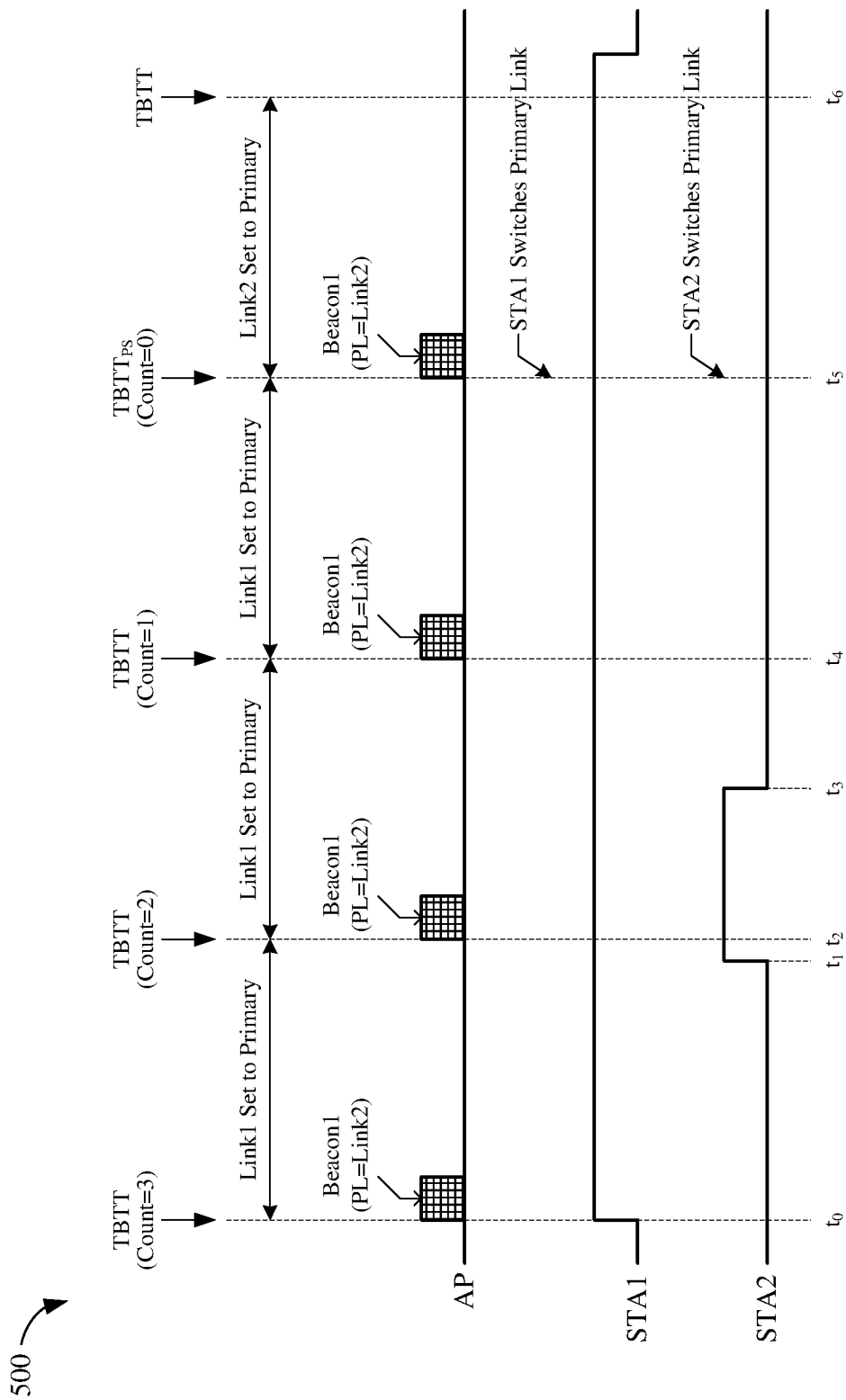
FIG. 5 shows a timing diagram depicting an example operation for changing the primary link in a multi-link communication.

FIG. 5 shows a timing diagram 500 depicting an example operation for changing the primary link in a ML communication. The operation may be performed during ML communications between an AP and a number of associated wireless stations STA1 and STA2. With reference for example to FIG. 1, the AP may correspond to AP 110 and each of the wireless stations STA1 or STA2 may correspond to any of the wireless stations STA1-STA3. In some implementations, each of the wireless stations STA1 and STA2 may be a single-MAC device that is configured to communicate with the AP via multiple communication links. In the example of FIG. 5, the ML communications between the AP and each of the wireless stations STA1 and STA2 may occur on a first communication link (Link1).

At time $t_0$, the AP may broadcast a beacon frame (Beacon1) on Link1. At this time, Link1 may be set as the primary link. In some implementations, Beacon1 may include PL information indicating a change in primary link that is scheduled to take effect at a future primary-switching time ($TBTT_{PS}$), as well as a countdown towards the primary-switching time. In some aspects, the PL information also may specify the communication link (Link2) that will become the new primary link at the primary-switching time. The countdown may indicate the number of TBTT periods or beacon intervals remaining before the change in primary link is scheduled to occur. Thus, in some aspects, Beacon1 broadcast at time $t_0$ may include a countdown timer indicating that the change in primary link is to occur in three successive beacon intervals (Count=3). In the example of FIG. 5, STA1 is awake at time $t_0$, whereas STA2 is in a power saving state. As a result, STA1 may receive the PL information, at time $t_0$, whereas STA2 may not. Upon receiving the PL information, STA1 may be configured to switch its primary link from Link1 to Link2 at the indicated primary-switching time (after three successive TBTTs).

At time $t_1$, STA2 wakes up from its power save state to access the shared wireless medium. In some aspects, time $t_1$ may coincide with a DTIM interval for which most (if not all) of the STAs in the wireless network are scheduled to listen for beacon frames from the AP. In some other aspects, time $t_1$ may coincide with the a TWT (or the start of a TWT service period) for which STA2 is assigned. Then, at time $t_2$, the AP may broadcast another Beacon1 on Link1. In some implementations, Beacon1 broadcast at time $t_2$ may include updated PL information. As described above, the PL information may include the new primary link (Link2) that is scheduled to take effect at the primary-switching time ($TBTT_{PS}$), as well as an updated countdown timer (Count=2). The wireless stations STA1 and STA2 may each receive the PL information at time $t_2$. Upon receiving the PL information, STA2 may be configured to switch its primary link from Link1 to Link2 at the indicated primary-switching time (after two successive TBTTs).

At time $t_3$, STA2 returns to a power saving state. Then, at time $t_4$, the AP broadcasts another Beacon1 on Link1. In some implementations, Beacon1 broadcast at time $t_4$ may include updated PL information. The PL information may indicate the new primary link (Link2) that is scheduled to take effect at the primary-switching time ($TBTT_{PS}$), as well as an updated countdown timer (Count=1). STA1 may receive this PL information, whereas STA2 may not (since it is in a power saving state). Nonetheless, STA2 may continue counting down the number of beacon intervals until the change in primary link is to occur (at $TBTT_{PS}$), for example, based on the countdown timer received, at time $t_2$, via PL information provided in Beacon1.

Finally, at time $t_5$, the AP broadcasts another Beacon1 on Link1. In some implementations, Beacon1 broadcast at time $t_5$ may include updated PL information. More specifically, in the example of FIG. 5, time $t_5$ coincides with the primary-switching time ($TBTT_{PS}$). Thus, the PL information may indicate the new primary link (Link2), as well as an updated countdown timer (Count=0) indicating that the new primary link is to take effect at this time. STA1 may receive the updated PL information via Beacon1 and may switch its primary link from Link1 to Link2, accordingly, at time $t_5$. However, STA2 may remain in a power saving state and therefore may not receive the updated PL information transmitted at time $t_5$. Nonetheless, STA2 also may switch its primary link from Link1 to Link2, at time $t_5$ (or the next time it wakes up from the power save state), based on its own internal countdown towards the primary-switching time ($TBTT_{PS}$).

By scheduling changes in primary link to occur at particular epochs, the wireless stations STA1 and STA2 are not required to be awake at the primary-switching time ($TBTT_{PS}$) in order to carry out the change in primary link. Accordingly, such implementations may provide a greater degree of flexibility for the wireless stations STA1 and STA2 to operate in accordance with their pre-configured power save schedules. For example, the AP may accommodate individual power save schedules of the respective STAs by providing all of the information necessary to execute the change in primary link (at the primary-switching time) when the STAs are awake and listening to the AP. In some implementations, after the primary-switching time has passed, subsequent beacon transmissions by the AP may include information indicating that a change in primary link occurred at a prior time (such as described with respect to FIGS. 4A-4C). This may further ensure that each STA in the wireless network is properly notified of the change in primary link, including any STAs that may not have received the PL information prior to the primary-switching time ($TBTT_{PS}$).

Figure 6:
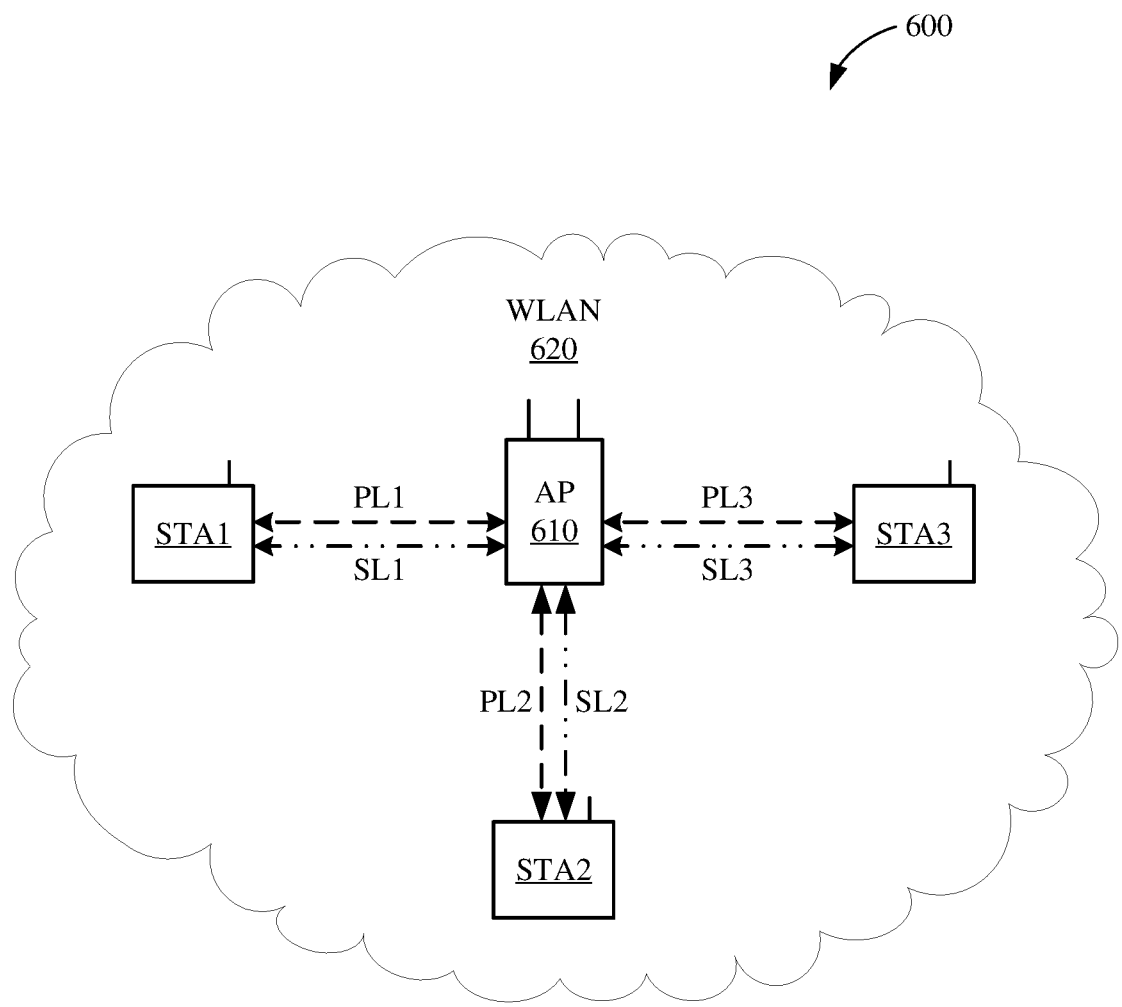
FIG. 6 shows another block diagram of a wireless system.

FIG. 6 shows another block diagram of a wireless system 600. The wireless system 600 is shown to include an AP 610 that forms a WLAN 620 with a number of wireless stations STA1-STA3. The wireless system 600 may be an example implementation of the wireless system 100 of FIG. 1. Thus, the AP 610 and wireless stations STA1-STA3 may be example implementations of the AP 110 and wireless stations STA1-STA3, respectively, of FIG. 1. Although only three wireless stations STA1-STA3 are shown in the example of FIG. 6 for simplicity, it is to be understood that the wireless system 600 may include any number of STAs.

In some implementations, the AP 610 may be capable of establishing multiple communication links with each of the wireless stations STA1-STA3. For example, the AP 610 may communicate with each of the wireless stations STA1-STA3 via a client-specific primary link (PL) and one or more secondary links (SL). More specifically, each of the wireless stations STA1, STA2, and STA3 may be assigned its own primary link PL1, PL2, and PL3 and secondary link SL1, SL2, and SL3, respectively. In the example of FIG. 6, each of the wireless stations STA1-STA3 is shown to have only one secondary link. However, in actual implementations the AP 610 may establish any number of secondary links with any of the wireless stations STA1-STA3. In some implementations, the communication links may encompass different frequency bands. In some other implementations, the communication links may encompass different channels of the same frequency band. Still further, in some implementations, the communication links may encompass different channels of different frequency bands.

In some aspects, each of the primary links PL1-PL3 may be associated with a different frequency band or set (or subset) of wireless channels. For example, the first primary link PL1 may be associated with one or more first wireless channels, the second primary link PL2 may be associated with one or more second wireless channels that are different than the first wireless channels, and the third primary link PL3 may be associated with one or more third wireless channels that are different than the first wireless channels and the second wireless channels. In some other aspects, two or more of the primary links PL1-PL3 may share the same wireless channels. For example, the first primary link PL1 and the third primary link PL3 may be associated with one or more first wireless channels while the second primary link PL2 is associated with one or more second wireless channels.

In some aspects, one or more of the secondary links SL1-SL3 may share one or more wireless channels with one or more of the primary links PL1-PL3 for another STA. For example, the first secondary link SL1 may have one or more wireless channels in common with the primary links PL2 or PL3, the second secondary link SL2 may have one or more wireless channels in common with the primary links PL1 or PL3, and the third secondary link SL3 may have one or more wireless channels in common with the primary links PL1 or PL2. In some other aspects, each of the secondary links SL-SL3 may be associated with different wireless channels. For example, the first secondary link SL1 may have no wireless channels in common with any of the primary links PL1-PL3 or secondary links SL2 or SL3, the second secondary link SL2 may have no wireless channels in common with any of the primary links PL1-PL3 or secondary links SL1 or SL3, and the third secondary link SL3 may have no wireless channels in common with any of the primary links PL1-PL3 or secondary links SL1 or S2.

In some implementations, each of the wireless devices in the WLAN 620 (including the AP 610 and each of the wireless stations STA1-STA3) may be a single-MAC device. Accordingly, only the primary links PL1-PL3 may be used by the respective wireless stations STA1-STA3 to contend for access to the shared wireless medium. In some other implementations, the WLAN 620 may include a combination of multi-MAC devices and single-MAC devices. For example, the AP 610 may be a multi-MAC device and the wireless stations STA1-STA3 may be single-MAC devices. In some implementations, where the AP 610 is a multi-MAC device, the AP 610 may contend for medium access on only the primary links PL1-PL3 when attempting to transmit downlink (DL) data to the wireless stations STA1-STA3, respectively. However, when attempting to transmit management and control frames (such as beacons, probe responses, and the like) or responding to uplink (UL) transmission by a particular STA, the AP 610 may contend for medium access on each of the primary and secondary links separately and concurrently.

Aspects of the present disclosure recognize that different STAs may prefer to use different wireless channels for their primary links. For example, the third wireless station STA3 may be located near a source of interference that impedes its ability to communicate on the 2.4 GHz frequency band (such as another WLAN or device that emits radiation in the 2.4 GHz frequency range), whereas the first wireless station STA1 may be far enough away from the source of interference so as not to be affected (or minimally affected). Thus, while the first wireless station STA1 may have little or no issues utilizing the 2.4 GHz frequency spectrum for its primary link PL1, the third wireless station STA3 may experience a significant loss in performance if it uses the same wireless channels for its primary link PL3 (such as low SNR, high PER, high latency, busy medium, and the like).

To improve the throughput and channel utilization in a multi-link environment, the implementations described herein may dynamically change (or reallocate) the primary links PL1-PL3 on a per-client (or per-device) basis. In some implementations, each of the wireless stations STA1-STA3 may selectively change its own primary link PL1-PL3, respectively, based at least in part on the channel conditions perceived by that STA on each of its communication links.

In some other implementations, the AP 610 also may change the primary link for any of the wireless stations STA1-STA3 on a per-client basis.

For example, when the third primary link PL3 is heavily loaded (due to heavy traffic or interference), and the load on the third secondary link SL3 is relatively light, the third wireless station STA3 may switch the roles of the third primary link PL3 and the third secondary link SL3 (so that the third secondary link SL3 becomes its new primary link). It is noted, however, that the change in primary link for the third wireless station STA3 may not affect the communication links for any of the remaining STAs. For example, the first wireless station STA1 may continue using PL1 as its primary link and SL1 as its secondary link while the second wireless station STA2 may continue using PL2 as its primary link and SL2 as its secondary link.

In some implementations, each wireless device may indicate its support for a "flexible" primary link (an ability to dynamically change its primary link) in one or more communication frames (such as management frames, control frames, data frames, and the like) exchanged between the AP 610 and the wireless stations STA1-STA3. For example, the communication frames may include a flexibility bit that can be set to "0" or "1" to indicate support for a flexible primary link.

Figure 7:
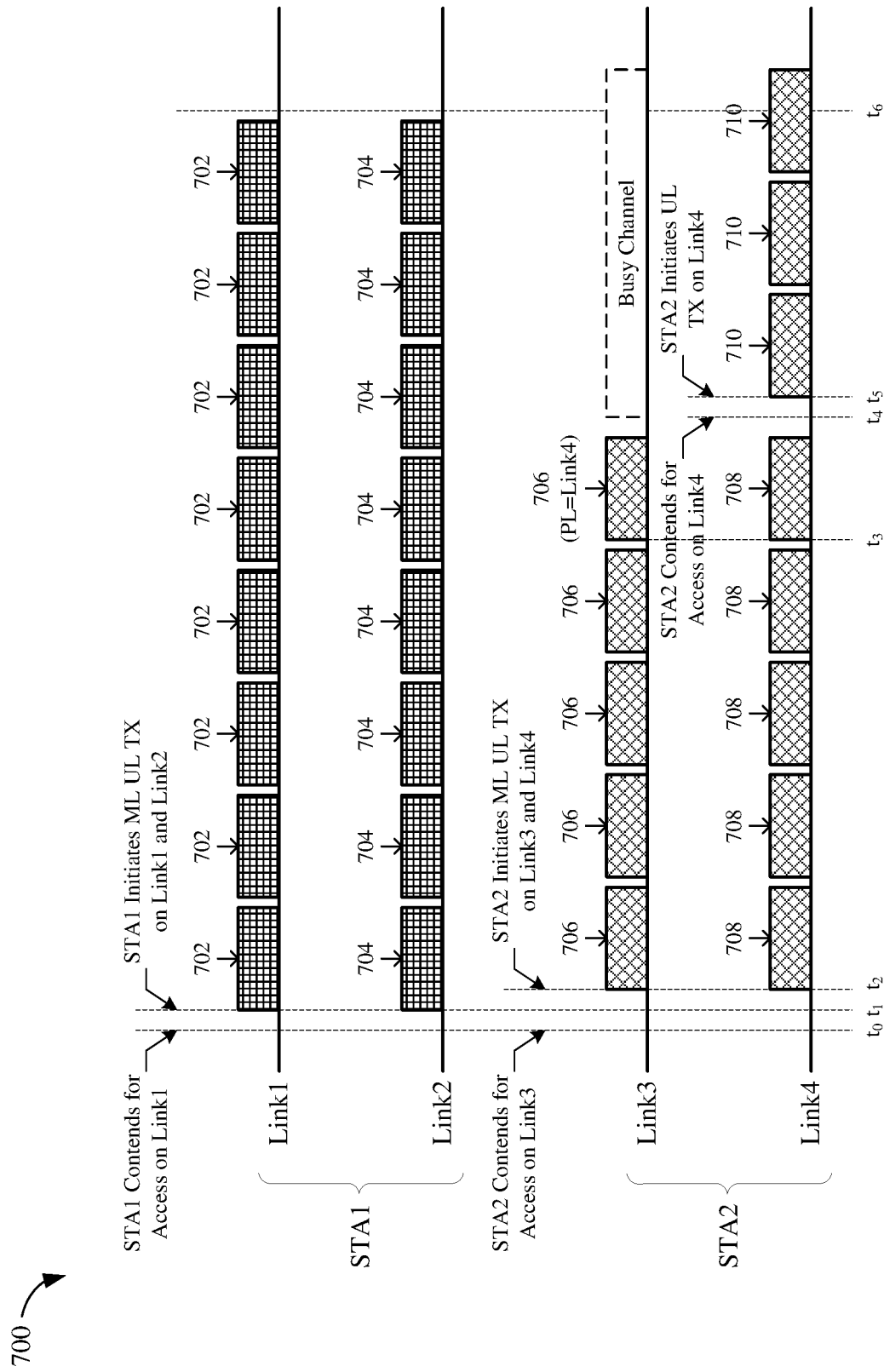
FIG. 7 shows a timing diagram depicting an example operation for changing a client-specific primary link in a multi-link environment.

FIG. 7 shows a timing diagram depicting an example operation 700 for changing a client-specific primary link in a multi-link environment. For purposes of discussion, the example operation 700 may be performed by a STA in a wireless network. For example, the wireless stations STA1 and STA2 shown in FIG. 7 may correspond to the wireless stations STA1 and STA2, respectively, of FIG. 6.

In some implementations, each of the wireless stations STA1 and STA2 may be a single-MAC device that is configured to communicate with an AP via multiple communication links. In the example of FIG. 7, the first wireless station STA1 is configured to communicate with the AP over a first communication link (Link1) and a second communication link (Link2) and the second wireless station STA2 is configured to communicate with the AP over a third communication link (Link3) and a fourth communication link (Link4). Each of the communication links Link1-Link4 may encompass a set of different wireless channels spanning one or more frequency bands. Although only four communication links are shown in FIG. 7, it is to be understood that each of the wireless stations STA1 and STA2 may establish any number of communication links with the AP.

At time $t_0$, Link1 may be configured as the primary link for the first wireless station STA1 and Link3 may be configured as the primary link for the second wireless station STA2. The first wireless station STA1 may detect that Link1 is idle and may thus contend for access to the shared wireless medium on Link1 at time $t_0$. For example, STA1 may wait a random back-off time before attempting to initiate a UL transmission (TX) including one or more PPDUs or frames 702 on Link1 (such as at time $t_1$). The second wireless station STA2 may detect that Link3 is idle and may thus contend for access to the shared wireless medium on Link3 at time $t_0$. For example, STA2 may wait a random back-off time before attempting to initiate a UL TX including one or more PPDUs or frames 706 on Link2 (such as at time $t_2$).

The first wireless station STA1 wins access to Link1, at time $t_1$, and senses that Link2 is also idle or otherwise available at this time. Thus, STA1 may transmit a PPDU 702 including UL data on Link1 and another PPDU 704 including UL data, concurrently, on Link2. For example, STA1 may use link aggregation techniques to aggregate UL data for transmission across its primary link (Link1) and its secondary link (Link2). Upon completion of the multi-link (ML) transmission at time $t_6$, the STA's access to Link1 may be terminated. For example, STA1 may have no more UL data in its queue or the TXOP assigned to STA1 may have expired. Accordingly, STA1 may relinquish control of Link1 to allow other devices to access the shared wireless medium.

The second wireless station STA2 wins access to Link3, at time $t_2$, and senses that Link4 is also idle or otherwise available at this time. Thus, STA2 may transmit a PPDU 706 including UL data on Link3 and another PPDU 708 including UL data, concurrently, on Link4. Thus, STA2 may use link aggregation techniques to aggregate UL data for transmission across its primary link (Link3) and its secondary link (Link4). At time $t_3$, the second wireless station STA2 may decide to switch its primary link from Link3 to Link4. For example, STA2 may determine that the load (activity or interference) on Link3 is above a threshold level, the load on Link4 is below a threshold level, the load on Link4 is less than the load on Link3, or any combination thereof. In some aspects, a STA may determine that a communication link is no longer suitable for use as its primary link if the packet error rate (PER) increases (such as above a threshold PER), the signal-to-noise ratio (SNR) decreases (such as below a threshold SNR), the STA is unable to satisfy its latency requirements, or the link is frequently detected as busy.

In some implementations, the second wireless station STA2 may include primary link (PL) information in a PPDU or frame 706 transmitted to the AP, at time $t_3$, to signal the change in primary link. In some aspects, the PL information may indicate that the primary link has changed. In some other aspects (such as when STA2 has multiple secondary links), the PL information may specify which secondary link is to become the new primary link. For example, the PL information may be provided in a PPDU 706 that includes a data frame, a management frame, or a control frame transmitted to the AP. In some implementations, the PL information may be provided in an OMI control field of a PPDU 706 that includes a data frame transmitted at time $t_3$. In some other implementations, the PL information may be provided in a new element or field of a PPDU 706 transmitted at time $t_3$. For example, the PL information may be provided in a new control frame having a dedicated purpose of signaling changes in the primary link. In the example of FIG. 7, the PL information is included in a last PPDU 706 sent by STA2 before the end of its TXOP. However, in actual implementations, the PL information may be included in any of the UL PPDUs 706 transmitted over the duration of its TXOP (such as from times $t_2$ to $t_4$).

After transmitting the PL information to the AP, the second wireless station STA2 may switch its primary link from Link3 to Link4. Upon receiving the PL information from STA2, the AP also may switch its primary link (with STA2) from Link3 to Link4. Then, at time $t_4$, STA2 may contend for access to the shared wireless medium on Link4. The second wireless station STA2 wins access to Link4, at time $t_5$, and senses that Link3 is busy at this time. For example, the activity on Link3 may be dominated by interference or other wireless devices operating on the same wireless channels or frequency band. Thus, STA2 may not be able to use link aggregation for UL transmissions. However, STA2 may proceed to transmit a PPDU or frame 710 including UL data, at time $t_5$, on its new primary link (Link4).

In the example of FIG. 7, each of the communication links Link1-Link4 is provided on a different wireless channel or non-overlapping set of channels. However, in some implementations, two or more of the communication links Link1-Link4 may share the same wireless channel(s). For example, Link3 may be provided on the same wireless channel or set of channels as Link1 and Link4 may be provided on the same wireless channel or set of channels as Link2. Thus, in some aspects, the wireless stations STA1 and STA2 may communicate with the AP over the same communication links (such as Link1 and Link2).

Figure 8:
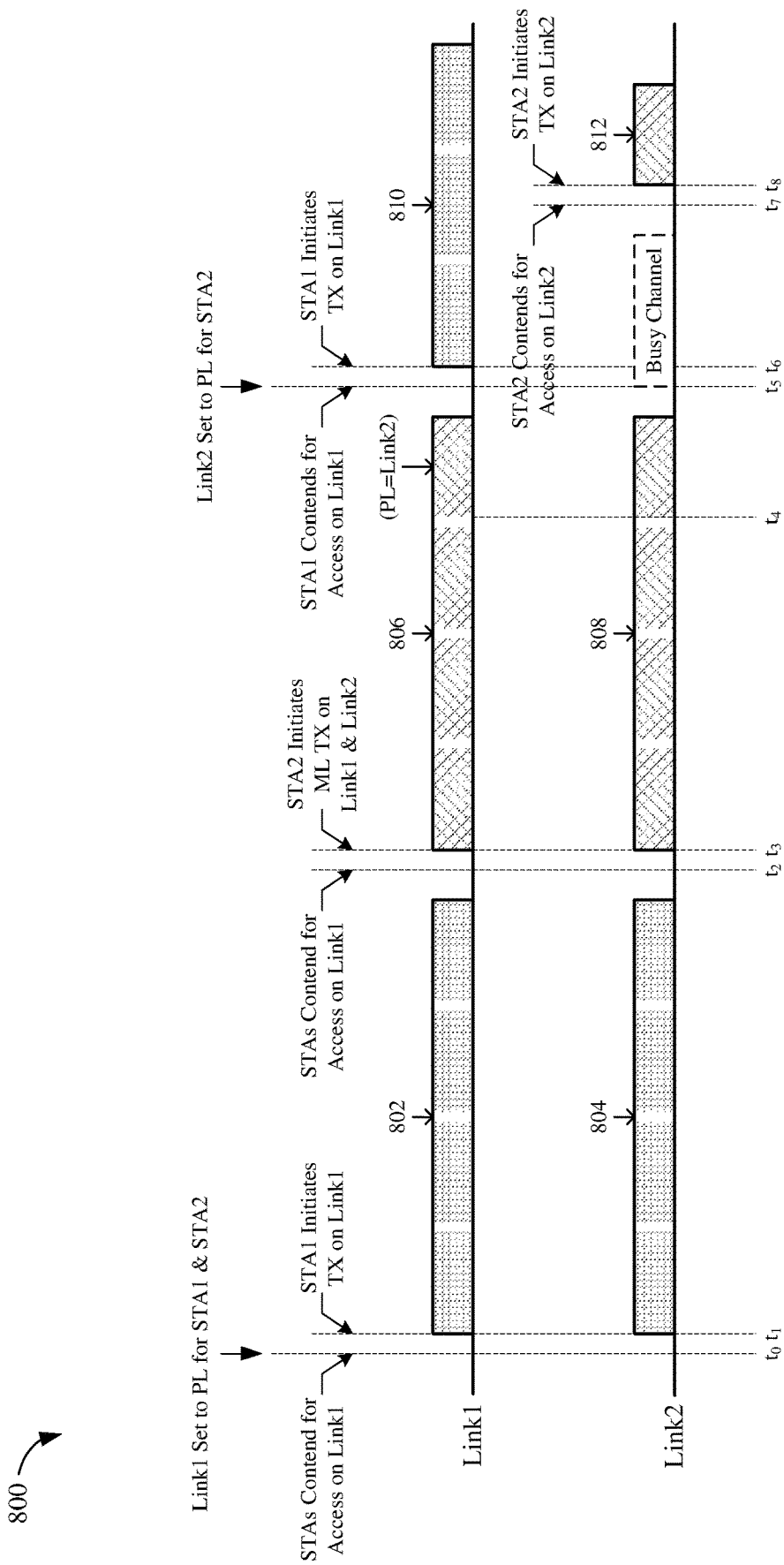
FIG. 8 shows a timing diagram depicting an example operation for changing a client-specific primary link in a shared multi-link environment.

FIG. 8 shows a timing diagram depicting an example operation 800 for changing a client-specific primary link in a shared multi-link environment. For purposes of discussion, the example operation 800 may be performed by a STA in a wireless network. For example, the wireless stations STA1 and STA2 shown in FIG. 8 may correspond to the wireless stations STA1 and STA2, respectively, of FIG. 6.

In some implementations, each of the wireless stations STA1 and STA2 may be a single-MAC device that is configured to communicate with an AP via multiple communication links. In the example of FIG. 8, each of the first wireless stations STA1 and STA2 is configured to communicate with the AP over a first communication link (Link1) and a second communication link (Link2). Each of the communication links Link1 and Link2 may encompass a set of different wireless channels spanning one or more frequency bands. Although only two communication links are shown in FIG. 8, it is to be understood that each of the wireless stations STA1 and STA2 may establish any number of communication links with the AP.

At time $t_0$, Link1 may be configured as the primary link for both of the wireless stations STA1 and STA2. The wireless stations STA1 and STA2 may detect that Link1 is idle and may thus contend for access to the shared wireless medium on Link1 at time $t_0$. For example, STA1 and STA2 may each wait a random back-off time before attempting to initiate a UL TX including a PPDU 802 on Link1. The first wireless station STA1 wins access to Link1, at time $t_1$, and senses that Link2 is also idle or otherwise available at this time. Thus, STA1 may use link aggregation techniques to aggregate UL data for transmission across its primary link (Link1) and its secondary link (Link2). For example, STA1 may transmit a PPDU 802 on Link1 concurrently with a transmission of a PPDU 804 on Link2. In the example of FIG. 8, each of the PPDUs 802 and 804 includes multiple (such as four) MPDUs (for example, in the form of an A-MPDU). However, in actual implementations, each of the PPDUs 802 and 804 may include fewer (such as one) or more MPDUs depending on the length or duration of the TXOP. Upon completion of the multi-link (ML) transmission at time $t_2$, the STA's access to Link1 may be terminated.

At time $t_2$, the wireless stations STA1 and STA2 may once again detect that Link1 is idle and may thus contend for access to the share wireless medium on Link1. As described above, STA1 and STA2 may each wait a random back-off time before attempting to initiate a UL TX on Link1. The second wireless station STA2 wins access to Link1, at time $t_3$, and senses that Link2 is also idle or otherwise available at this time. Thus, STA2 may use link aggregation techniques to aggregate UL data for transmission across its primary link (Link1) and its secondary link (Link2). For example, STA2 may transmit a PPDU 806 on Link1 concurrently with a transmission of a PPDU 808 on Link2. At time $t_4$, the second wireless station STA2 may decide to switch its primary link from Link1 to Link2. For example, STA2 may determine that the load (activity or interference) on Link1 is above a threshold level, the load on Link2 is below a threshold level, the load on Link2 is less than the load on Link1, or any combination thereof.

In some implementations, the second wireless station STA2 may include PL information in the PPDU 806 transmitted to the AP, at time $t_4$, to signal the change in primary link. In some aspects, the PL information may indicate that the primary link has changed. In some other aspects (such as when STA2 has multiple secondary links), the PL information may specify which secondary link is to become the new primary link. For example, the PL information may be provided in a data frame, a management frame, or a control frame of the PPDU 806 transmitted to the AP. In some implementations, the PL information may be provided in an OMI control field of a data frame of the PPDU 806 transmitted at time $t_4$. In some other implementations, the PL information may be provided in a new element or field of the PPDU transmitted at time $t_4$. For example, the PL information may be provided in a new control frame having a dedicated purpose of signaling changes in the primary link. In the example of FIG. 8, the PL information is included in a last MPDU of the PPDU 806 transmitted by STA2. However, in actual implementations, the PL information may be included in any MPDU included in the PPDU 806 (such as from times $t_3$ to $t_5$).

After transmitting the PL information to the AP, the second wireless station STA2 may switch its primary link from Link1 to Link2. Upon receiving the PL information from STA2, the AP also may switch its primary link with STA2 from Link2 to Link1. It is noted, however, that Link1 remains the primary link between the AP and STA1. Thus, at time $t_5$, STA1 may once again contend for access to the shared wireless medium on Link1. The first wireless station STA1 wins access to Link1, at time $t_6$, and senses that Link2 is busy at this time. For example, the activity on Link2 may be dominated by interference or other wireless devices operating on the same wireless channels or frequency band. Thus, STA1 may not be able to use link aggregation for UL transmissions. However, STA1 may proceed to transmit a PPDU 810 including UL data, at time $t_6$, on its current primary link (Link1).

At time $t_7$, the second wireless station STA2 senses that Link2 (its new primary link) is idle and may thus contend for access to the shared wireless medium on Link2. The second wireless station STA2 wins access to Link2, at time $t_8$, and senses that Link1 is busy at this time. For example, the activity on Link1 may be due to the UL transmissions from STA1. Thus, STA2 may not be able to use link aggregation for UL transmissions. However, STA2 may proceed to transmit a PPDU 812 including UL data, at time $t_8$, on its new primary link (Link2). It is noted that, at time $t_8$, the wireless stations STA1 and STA2 may concurrently transmit PPDUs 810 and 812 including UL data over their respective primary links (Link1 and Link2).

Figure 9:
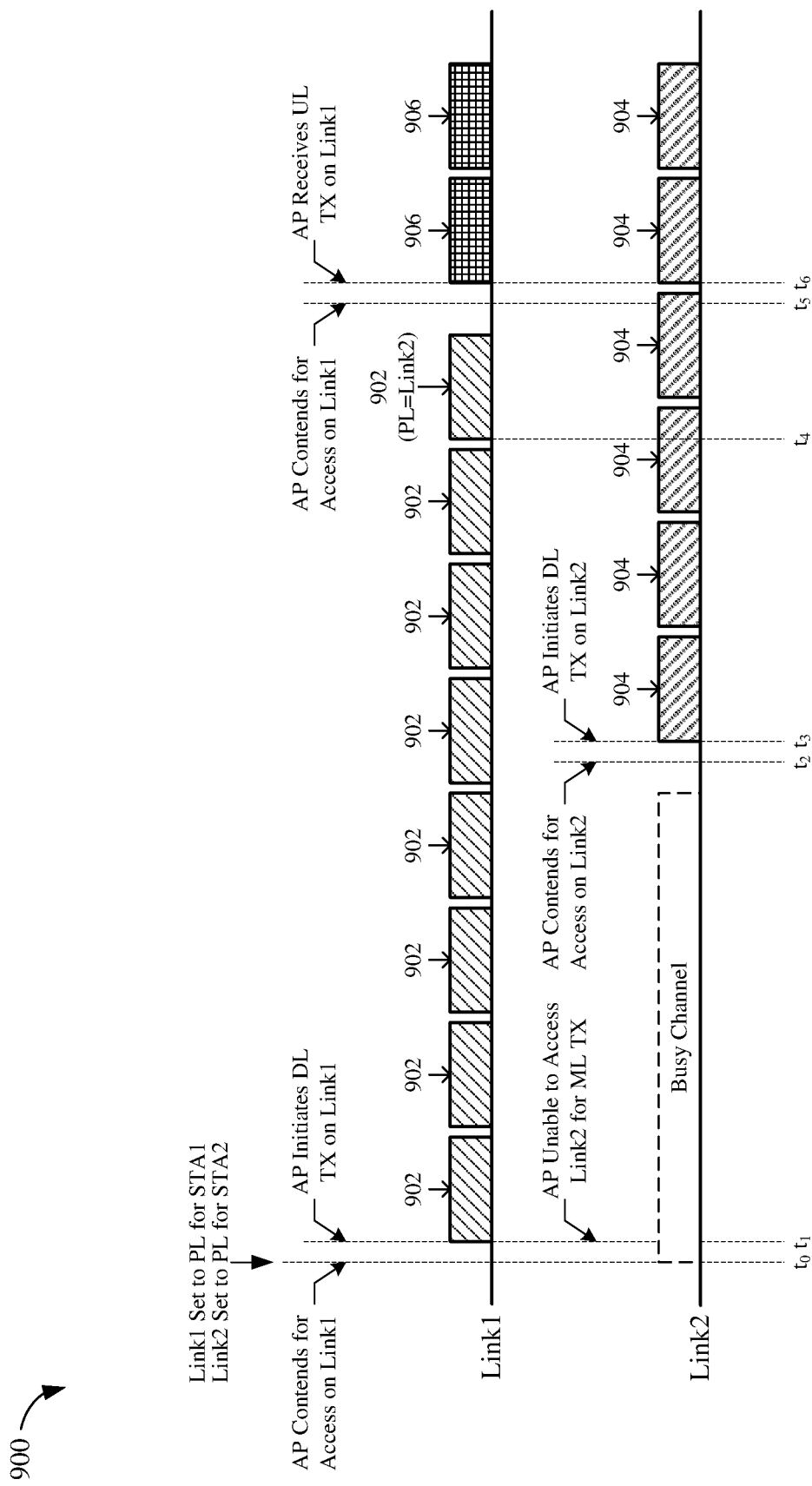
FIG. 9 shows a timing diagram depicting an example multi-link communication with client-specific primary links.

FIG. 9 shows a timing diagram depicting an example multi-link communication 900 with client-specific primary links. For purposes of discussion, the example communication 900 may be performed by an AP in a wireless network. For example, the AP may correspond to the AP 610 of FIG. 6.

In some implementations, the AP may be a multi-MAC device that is capable of contending on multiple communication links, concurrently. In the example of FIG. 9, the AP is configured to communicate with wireless stations STA1 and STA2 over a first communication link (Link1) and a second communication link (Link2). Each of the communication links Link1 and Link2 may encompass a set of different wireless channels spanning one or more frequency bands. Although only two communication links are shown in FIG. 9, it is to be understood that the AP may establish any number of communication links with the wireless stations STA1 and STA2 (and other STAs not shown for simplicity).

At time $t_0$, the AP may have DL data to transmit to the first wireless station STA1. At this time, Link1 is configured as the primary link for the first wireless station STA1 and Link2 is configured as the primary link for the second wireless station STA2. Thus, the AP may detect that Link1 is idle and contend for access to Link1 at time $t_0$. For example, the AP may wait a random back-off time before attempting to initiate a DL TX including one or more PPDUs or frames 902 on Link1 (such as at time $t_1$). The AP wins access to Link1, at time $t_1$, and senses that Link2 is busy at this time. For example, the activity on Link2 may be dominated by interference or other wireless devices operating on the same wireless channels or frequency band (such as STA2 transmitting UL data on Link2). Thus, the AP may not be able to use link aggregation for DL transmissions.

The AP may proceed to transmit a PPDU or frame 902 including DL data, at time $t_1$, to STA1 via its primary link (Link1). It may be desirable to ensure that the first wireless station STA1 is awake (and not in a power save mode) or otherwise listening for DL communications from the AP. Thus, in some implementations, the AP may schedule the transmission of the PPDU or frame 902 on Link1 (at time $t_1$) to coincide with a TWT service period of the first wireless station STA1.

At time $t_2$, the AP senses that Link2 is now idle. However, because the AP has an ongoing transmission of PPDUs or frames 902 on Link1, the AP may not use Link2 for link aggregation. For example, the AP may need to cease transmitting the PPDUs or frames 902 on Link1 and initiate a new ML DL TX concurrently across Link1 and Link2 to avoid cross-channel interference across the communication links. This may be undesirable, as it may require the AP to contend for access to Link1 once again. However, because Link2 is the primary link for the second wireless station STA2, the AP may still utilize the available wireless channels to transmit a PPDU or frame 904 including DL data to STA2.

Thus, the AP may contend for access to Link2 at time $t_2$. For example, the AP may wait a random back-off time before attempting to initiate a DL TX including one or more PPDUs or frames 904 on Link2 (such as a time $t_3$). The AP wins access to Link2, at time $t_3$, and transmits a PPDU or frame 904 including DL data to STA2. In some implementations, the transmission of PPDUs or frames 904 on Link2 (at time $t_3$) may coincide with a TWT service period for STA2. It is noted that, at time $t_3$, the AP may concurrently transmit PPDUs 902 and 904 including DL data to the wireless stations STA1 and STA2 over their respective primary links (Link1 and Link2).

At time $t_4$, the AP may decide to switch the primary link for STA1 from Link1 to Link2. For example, the AP may determine that the load (activity or interference) on Link1 is above a threshold level, the load on Link2 is below a threshold level, the load on Link2 is less than the load on Link1, or any combination thereof. In some aspects, the AP may determine that a communication link is no longer suitable for use as the primary link for a given STA if the PER increases (such as above a threshold PER), the SNR decreases (such as below a threshold SNR), the AP is unable to satisfy its latency requirements, or the link is frequently detected as busy.

In some implementations, the AP may include PL information in a PPDU or frame 902 transmitted to the first wireless station STA1, at time $t_4$, to signal the change in primary link. In some aspects, the PL information may indicate that the primary link has changed. In some other aspects (such as when STA1 has multiple secondary links), the PL information may specify which secondary link is to become the new primary link. For example, the PL information may be provided in a PPDU 902 that includes a data frame, a management frame, or a control frame transmitted to STA1. In some implementations, the PL information may be provided in an OMI control field of a PPDU 902 that includes a data frame transmitted at time $t_4$. In some other implementations, the PL information may be provided in a new element or field of a PPDU 902 transmitted at time $t_4$. For example, the PL information may be provided in a new control frame having a dedicated purpose of signaling changes in the primary link.

In some implementations, the AP may dynamically change the primary links for multiple STAs using a single control frame. For example, the PPDU or frame 902 transmitted by the AP at time $t_4$ may be a broadcast or multicast frame that includes PL information for STA1 as well as PL information for a third STA that currently uses Link1 as its primary link. The PL information for STA1 may indicate a switch to Link2 as the primary link for STA1 and the PL information for the third STA may indicate a switch to Link2 (or another communication link) as the primary link for the third STA. In the example of FIG. 9, the PL information is included in a last PPDU 902 sent by the AP before the end of its TXOP. However, in actual implementations, the PL information may be included in any of the PPDUs 902 transmitted over the duration of its TXOP (such as from times $t_1$ to $t_5$).

After transmitting the PL information to the first wireless station STA1, the AP may switch the primary link for STA1 from Link1 to Link2. Upon receiving the PL information from the AP, the first wireless station STA1 also may switch its primary link from Link1 to Link2. Then, at time $t_5$, the AP has completed the DL TX to STA1 (or reached the end of its TXOP) and contends once again for access to Link1. However, another STA (such as STA3) wins access to Link1, at time $t_6$, and begins transmitting one or more PPDUs 906 including UL data to the AP. In some implementations, the transmission of the PPDUs 906 on Link1 (at time $t_6$) may coincide with a TWT service period for the STA that initiated the UL TX. It is noted that, at time $t_6$, the AP may concurrently transmit PPDUs 904 including DL data and receive PPDUs 906 including UL data over Link1 and Link2.

Although not shown in FIG. 9, the AP also may broadcast beacons on one or more of the communication links to establish and maintain connectivity with any STAs in the vicinity. In some implementations, the AP may broadcast beacon frames on each of the communication links Link1 and Link2 (such as to support legacy STAs that may not be capable of ML functionality). In some other implementations, the AP may broadcast beacon frames on only one of the communication links (such as Link1) and may broadcast mini-beacons on the remaining communication links (such as Link2). As used herein, the term "mini-beacon" may refer to any frame or PPDU that carries beacon information in a condensed or shortened frame format (compared to a standard beacon frame). For example, the IEEE 802.11ai specification defines a Fast Initial Link Setup (FILS) Discovery frame that may be suitable for use as a mini-beacon frame.

Figure 10:
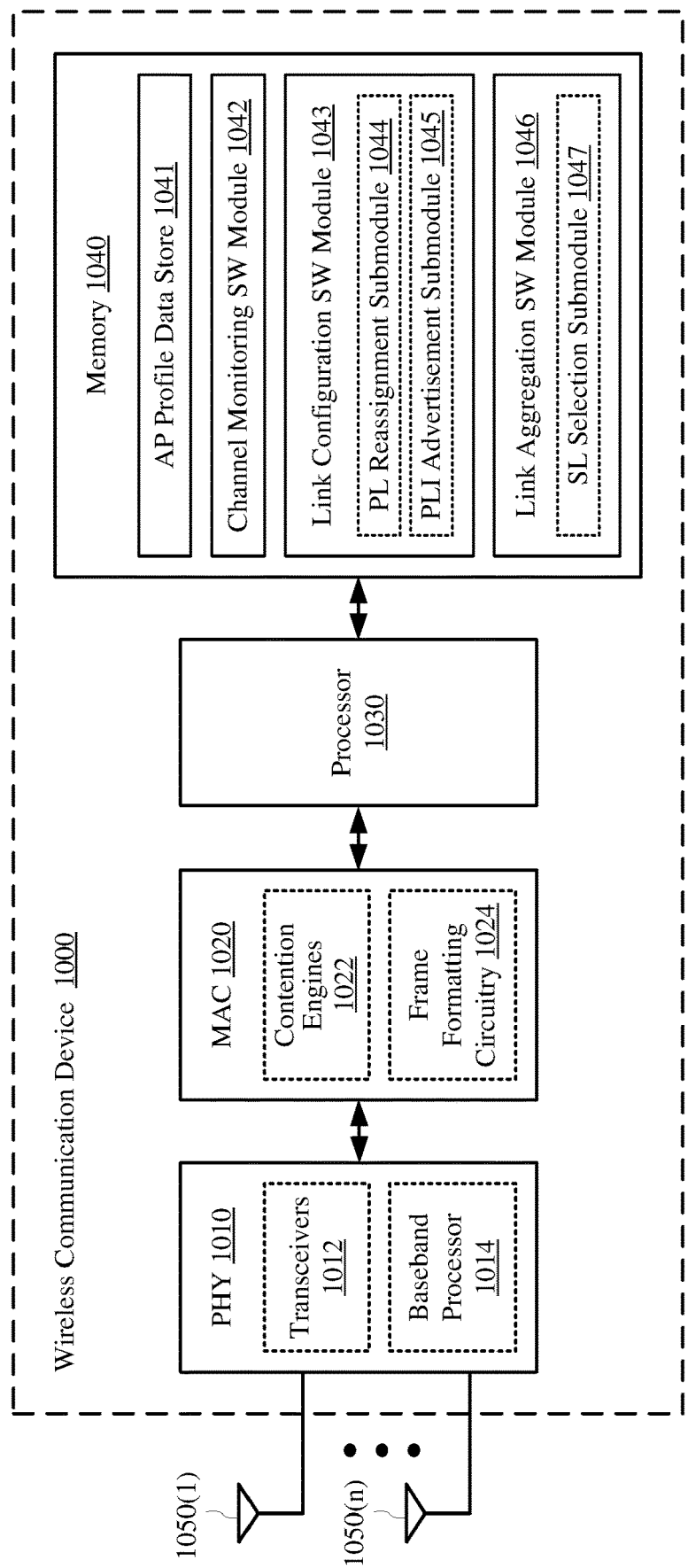
FIG. 10 shows a block diagram of an example wireless communication device for use in wireless communication according to some implementations.

FIG. 10 shows a block diagram of an example wireless communication device 1000 for use in wireless communication according to some implementations. In some implementations, the wireless communication device 1000 can be an example of a device for use in a STA such as one of the STAs STA1-STA3 described above with reference to FIGS. 1 and 6. For example, the wireless communication device 1000 can be a chip, system on chip (SoC) or chipset that includes one or more modems (for example, a Wi-Fi (IEEE 802.11) modem or a cellular modem). In other instances, the wireless communication device 1000 can be a STA that includes such a chip, SoC or chipset as well as at least one transceiver and at least one antenna. In some implementations, the wireless communication device 1000 may be a wireless device (such as a ML STA) that is capable of communicating over multiple communication links, concurrently, using link aggregation techniques. The wireless communication device 1000 may include a PHY 1010, a MAC 1020, a processor 1030, a memory 1040, and a number of antennas 1050(1)-1050(n).

The PHY 1010 may include a number of transceivers 1012 and a baseband processor 1014. The transceivers 1012 may be coupled to the antennas 1050(1)-1050(n), either directly or through an antenna selection circuit (not shown for simplicity). The transceivers 1012 may be used to communicate wirelessly with one or more APs, with one or more STAs, or with other suitable devices. The baseband processor 1014 may be used to process outgoing signals received from the processor 1030 or the memory 1040 and to forward the processed signals to the transceivers 1012 for transmission via one or more of the antennas 1050(1)-1050(n), and may be used to process incoming received from one or more of the antennas 1050(1)-1050(n) via the transceivers 1012 and to forward the processed signals to the processor 1030 or the memory 1040.

Although not shown in FIG. 10, for simplicity, the transceivers 1012 may include any number of transmit chains to process and transmit outgoing signals to other wireless devices via the antennas 1050(1)-1050(n), and may include any number of receive chains to process incoming signals received from the antennas 1050(1)-1050(n). Thus, in some implementations, the wireless communication device 1000 may be configured for MIMO operations including, for example, single-user MIMO (SU-MIMO) operations and multi-user (MU-MIMO) operations. In addition, the wireless communication device 1000 may be configured for OFDMA communications or other suitable multiple access mechanisms, for example, as may be specified by any of the IEEE 802.11 standards.

The MAC 1020 may include at least a number of contention engines 1022 and frame formatting circuitry 1024. The contention engines 1022 may contend for access to the shared wireless medium on a primary communication link, and may store packets for transmission over the shared wireless medium. In some implementations, the contention engines 1022 may be separate from the MAC 1020. Still further, in some implementations, the contention engines 1022 may be implemented as one or more software modules (stored in the memory 1040 or in memory provided within the MAC 1020). The frame formatting circuitry 1024 may be used to create or format frames received from the processor 1030 or the memory 1040 (such as by adding MAC headers to PDUs provided by the processor 1030), and may be used to re-format frames received from the PHY 1010 (such as by stripping the MAC headers from frames received from the PHY 1010).

The memory 1040 may include an AP profile data store 1041 that stores profile information for a plurality of BSSs. The profile information for a particular BSS may include, for example, the BSSID, MAC address, channel information, received signal strength indicator (RSSI) values, goodput values, channel state information (CSI), supported data rates, connection history with the BSS, a trustworthiness value of the BSS (indicating a level of confidence about the BSS's location or other properties associated with the BSS), and any other suitable information pertaining to or describing the operation of the BSS. In some implementations, the profile information for a particular BSS may include one or more wireless channels to be used as a primary communication link (such as for contention). In some other implementations, the profile information for a particular BSS may include wireless channels to be used as one or more secondary communication links (such as for link aggregation).

The memory 1040 also may include a non-transitory computer-readable medium (one or more nonvolatile memory elements, such as EPROM, EEPROM, Flash memory, a hard drive, and the like) that may store at least the following software (SW) modules:
  a channel monitoring SW module 1042 to monitor one or more channel conditions of a plurality of wireless channels available for wireless communications;
  a link configuration SW module 1043 to establish a primary communication link on a first subset of the wireless channels and to selectively access one or more secondary communication links on one or more subsets of the remaining wireless channels, the link configuration SW module 1043 including:
    a primary link (PL) reassignment submodule 1044 to dynamically change the primary communication link from the first subset of wireless channels to another subset of the wireless channels; and
    a primary link information (PLI) advertisement submodule 1045 to communicate primary link information, indicating the change in the primary communication link, to the AP; and
  a link aggregation SW module 1046 to access one or more of the secondary communication links, concurrently with the primary communication link, using link aggregation techniques, the link aggregation SW module 1046 including:
    a secondary link (SL) selection submodule 1047 to select one or more of the secondary communication links for link aggregation based, at least in part, on the channel conditions of the secondary communication links.

Each software module includes instructions that, when executed by the processor 1030, cause the wireless communication device 1000 to perform the corresponding functions.

For example, the processor 1030 may execute the channel monitoring SW module 1042 to monitor one or more channel conditions of a plurality of wireless channels available for wireless communications. The processor 1030 may execute the link configuration SW module 1043 to establish a primary communication link on a first subset of the wireless channels and to selectively access one or more secondary communication links on one or more subsets of the remaining wireless channels. In executing the link configuration SW module 1043, the processor 1030 may further execute the PL reassignment submodule 1044 or the PLI advertisement submodule 1045.

The processor 1030 may execute the PL reassignment submodule 1044 to dynamically change the primary communication link from the first subset of wireless channels to another subset of the wireless channels. For example, the wireless communication device 1000 may change its primary communication link from the first subset of wireless channels to a second subset of wireless channels (which may be associated with a secondary communication link) if the amount of activity on the first subset of wireless channels is above a threshold amount, the amount of activity on the second subset of wireless channels is below a second threshold amount, the amount of activity on the first subset of wireless channels exceeds the amount of activity on the second wireless channels, or any combination thereof. The amount of activity may be based on a frequency of busy channel conditions on one or more of the wireless channels or a number of failed attempts to access one or more of the wireless channels.

The processor 1030 may execute the PLI advertisement submodule 1045 to communicate primary link information, indicating the change in the primary communication link, to the AP. In some aspects, the primary link information may indicate a change in the primary communication link. In some other aspects, the primary link information may indicate the subset of wireless channels to be used for the (new) primary communication link. For example, the new primary communication link may be implemented on one or more wireless channels previously associated with a secondary communication link. In some implementations, execution of the PLI advertisement submodule 1045 may cause the wireless communication device 1000 to transmit a data frame, management frame, or control frame that includes the PL information. For example, the PL information may be provided in an OMI control field of a data frame.

The processor 1030 also may execute the link aggregation SW module 1046 to access one or more of the secondary communication links, concurrently with the primary communication link, using link aggregation techniques. In some aspects, the wireless communication device 1000 may access the secondary communication links only after the wireless communication device 1000 has already gained access to the shared wireless medium via the primary communication link (such as through contention). In executing the link aggregation SW module 1046 the processor 1030 may further execute the SL selection submodule 1047 to select one or more of the secondary communication links for link aggregation based, at least in part, on the channel conditions of the secondary communication links. For example, execution of the SL selection submodule 1047 may cause the wireless communication device 1000 to determine an availability of one or more of the secondary links based at least in part on the one or more channel conditions measured by the channel monitoring SW module 1042.

Figure 11:
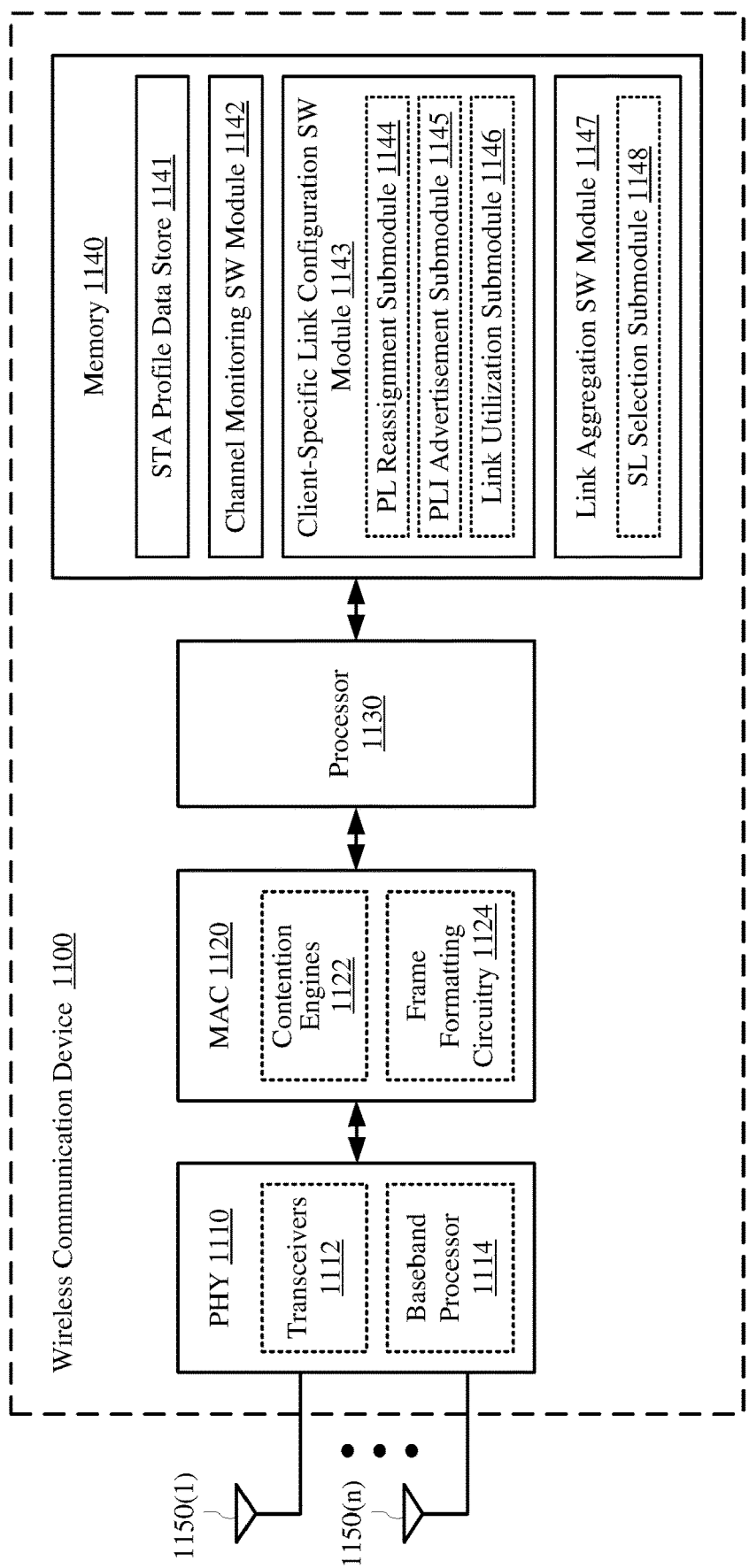
FIG. 11 shows another block diagram of an example wireless communication device for use in wireless communication according to some implementations.

FIG. 11 shows another block diagram of an example wireless communication device 1100 for use in wireless communication according to some implementations. In some implementations, the wireless communication device 1100 can be an example of a device for use in an AP such as the AP 110 or the AP 610 described above with reference to FIGS. 1 and 6. For example, the wireless communication device 1100 can be a chip, system on chip (SoC) or chipset that includes one or more modems (for example, a Wi-Fi (IEEE 802.11) modem or a cellular modem). In other instances, the wireless communication device 1100 can be an AP that includes such a chip, SoC or chipset as well as at least one transceiver and at least one antenna. In some implementations, the wireless communication device 1100 may be a wireless device (such as a ML AP) that is capable of communicating over multiple communication links, concurrently, using link aggregation techniques. The wireless communication device 1100 may include a PHY 1110, a MAC 1120, a processor 1130, a memory 1140, and a number of antennas 1150(1)-1150(n).

The PHY 1110 may include a number of transceivers 1112 and a baseband processor 1114. The transceivers 1112 may be coupled to the antennas 1150(1)-1150(n), either directly or through an antenna selection circuit (not shown for simplicity). The transceivers 1112 may be used to communicate wirelessly with one or more STAs, with one or more APs, or with other suitable devices. The baseband processor 1114 may be used to process outgoing signals received from the processor 1130 or the memory 1140 and to forward the processed signals to the transceivers 1112 for transmission via one or more of the antennas 1150(1)-1150(n), and may be used to process incoming signals received from one or more of the antennas 1150(1)-1150(n) via the transceivers 1112 and to forward the processed signals to the processor 1130 or the memory 1140.

Although not shown in FIG. 11, for simplicity, the transceivers 1112 may include any number of transmit chains to process and transmit outgoing signals to other wireless devices via the antennas 1150(1)-1150(n), and may include any number of receive chains to process incoming signals received from the antennas 1150(1)-1150(n). Thus, in some implementations, the wireless communication device 1100 may be configured for MIMO operations including, for example, single-user MIMO (SU-MIMO) operations and multi-user (MU-MIMO) operations. In addition, the wireless communication device 1100 may be configured for OFDMA communications or other suitable multiple access mechanisms, for example, as may be specified by any of the IEEE 802.11 standards.

The MAC 1120 may include at least a number of contention engines 1122 and frame formatting circuitry 1124. The contention engines 1122 may contend for access to the shared wireless medium on a primary communication link, and may store packets for transmission over the shared wireless medium. In some implementations, the contention engines 1122 may be separate from the MAC 1120. Still further, in some implementations, the contention engines 1122 may be implemented as one or more software modules (stored in the memory 1140 or in memory provided within the MAC 1120). The frame formatting circuitry 1124 may be used to create or format frames received from the processor 1130 or the memory 1140 (such as by adding MAC headers to PDUs provided by the processor 1130), and may be used to re-format frames received from the PHY 1110 (such as by stripping the MAC headers from frames received from the PHY 1110). In the example of FIG. 11, the wireless communication device 1100 is shown to include a single MAC 1120. However, in actual implementations, the wireless communication device 1100 may be a multi-MAC device, including a plurality of MACs that may be used to contend on multiple communication links, concurrently, of a multi-link environment.

The memory 1140 may include a STA profile data store 1141 that stores profile information for a plurality of STAs. The profile information for a particular STA may include, for example, its MAC address, supported data rates, connection history with the wireless communication device 1100, one or more resource units (RUs) allocated to the STA, and any other suitable information pertaining to or describing the operation of the STA. In some implementations, the profile information for a particular STA may include one or more wireless channels to be used as a primary communication link (such as for contention). In some other implementations, the profile information for a particular STA may include wireless channels to be used as one or more secondary communication links (such as for link aggregation).

The memory 1140 also may include a non-transitory computer-readable medium (one or more nonvolatile memory elements, such as EPROM, EEPROM, Flash memory, a hard drive, and the like) that may store at least the following software (SW) modules:

- a channel monitoring SW module 1142 to monitor one or more channel conditions of a plurality of wireless channels available for wireless communications;
- a link configuration SW module 1143 to establish a first primary communication link with a first STA on a first subset of the wireless channels and to establish a second primary communication link with a second STA on a second subset of wireless channels, the link configuration SW module 1143 including:
  - a primary link (PL) reassignment submodule 1144 to dynamically change the primary communication link for the first STA or the second STA to another subset of the wireless channels;
  - a primary link information (PLI) advertisement submodule 1145 to communicate primary link information, indicating the change in the primary communication link, to the given STA; and
  - a link utilization submodule 1146 to selectively utilize the communication links for multi-link communications with the first STA or the second STA or concurrent communications with the first STA and the second STA; and
- a link aggregation SW module 1147 to access one or more of the secondary communication links, concurrently with the primary communication link, using link aggregation techniques, the link aggregation SW module 1147 including:
  - a secondary link (SL) selection submodule 1148 to select one or more of the secondary communication links for link aggregation based, at least in part, on the channel conditions of the secondary communication links.

Each software module includes instructions that, when executed by the processor 1130, cause the wireless communication device 1100 to perform the corresponding functions.

For example, the processor 1130 may execute the channel monitoring SW module 1142 to monitor one or more channel conditions of a plurality of wireless channels available for use in the BSS. The processor 1130 may execute the link configuration SW module 1143 to establish a first primary communication link with a first STA on a first subset of the wireless channels and to establish a second primary communication link with a second STA on a second subset of wireless channels. In executing the link configuration SW module 1143, the processor 1130 may further execute the PL switching submodule 1144, the PLI advertisement submodule 1145, or the link utilization submodule 1146.

The processor 1130 may execute the PL reassignment submodule 1144 to dynamically change the primary communication link for the first STA or the second STA to another subset of the wireless channels. In some implementations, execution of the PL reassignment submodule 1144 may cause the wireless communication device 1100 to change the primary communication link for the selected STA based, at least in part, on the one or more channel conditions measured by the channel monitoring SW module 1142. For example, the wireless communication device 1100 may change the primary communication link from the first subset of wireless channels to a second subset of wireless channels (which may be associated with a secondary communication link) if the amount of activity on the first subset of wireless channels is above a threshold amount, the amount of activity on the second subset of wireless channels is below a second threshold amount, the amount of activity on the first subset of wireless channels exceeds the amount of activity on the second wireless channels, or any combination thereof. The amount of activity may be based on a frequency of busy channel conditions on one or more of the wireless channels or a number of failed attempts to access one or more of the wireless channels The processor 1130 may execute the PLI advertisement submodule 1145 to communicate primary link information, indicating the change in the primary communication link, to the given STA. In some aspects, the primary link information may indicate a change in the primary communication link. In some other aspects, the primary link information may indicate the subset of wireless channels to be used for the (new) primary communication link. For example, the new primary communication link may be implemented on one or more wireless channels previously associated with a secondary communication link. In some implementations, execution of the PLI advertisement submodule 1145 may cause the wireless communication device 1100 to transmit a data frame, management frame, or control frame that includes the PL information. For example, the PL information may be provided in an OMI control field of a data frame.

The processor 1130 may execute the link utilization submodule 1146 to selectively utilize the communication links for multi-link communications with the first STA or the second STA or concurrent communications with the first STA and the second STA. For example, in some implementations, the wireless communication device may utilize the first wireless channels and the second wireless channels for ML DL transmissions to one of the first STA or the second STA (using link aggregation techniques). In some other implementations, the wireless communication device may utilize the first wireless channels for DL or UL communications with the first STA while concurrently utilizing the second wireless channels for DL or UL communications with the second STA.

The processor 1130 also may execute the link aggregation SW module 1147 to access one or more of the secondary communication links, concurrently with the primary communication link, using link aggregation techniques. In some aspects, the wireless communication device 1100 may access the secondary communication links only after the wireless communication device 1100 has already gained access to the shared wireless medium via the primary communication link (such as through contention). In executing the link aggregation SW module 1147 the processor 1130 may further execute the SL selection submodule 1148 to select one or more of the secondary communication links for link aggregation based, at least in part, on the channel conditions of the secondary communication links. For example, execution of the SL selection submodule 1148 may cause the wireless communication device 1100 to determine an availability of one or more of the secondary links based at least in part on the one or more channel conditions measured by the channel monitoring SW module 1142.

Figure 12:
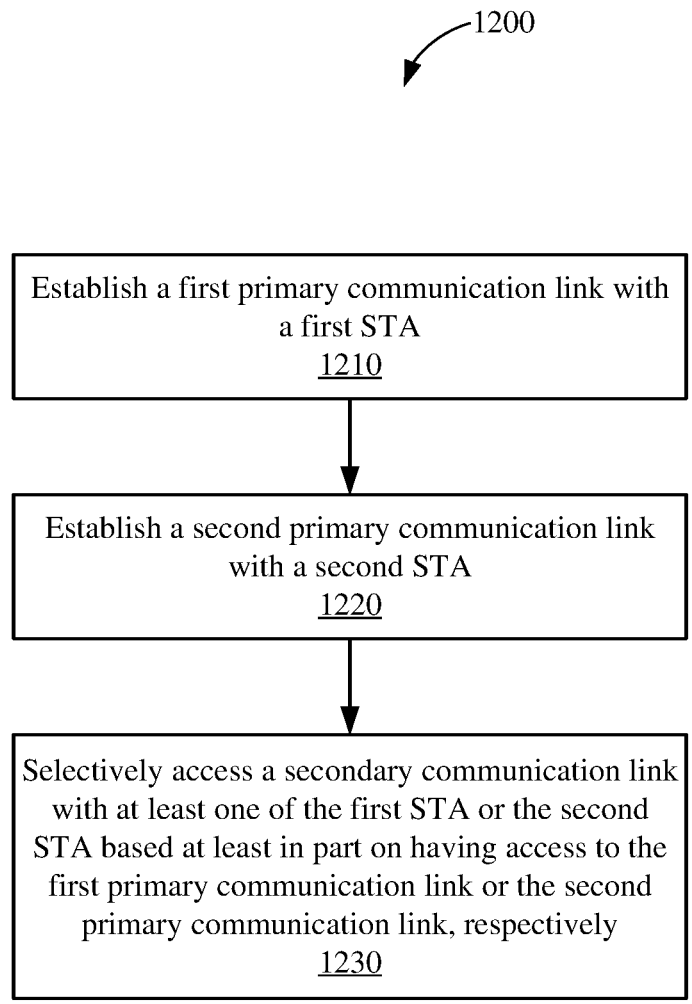
FIG. 12 shows a flowchart illustrating an example process for configuring a multi-link environment according to some implementations.

FIG. 12 shows a flowchart illustrating an example process 1200 for configuring a multi-link environment according to some implementations. The process 1200 may be performed by any AP capable of link aggregation. With reference for example to FIG. 5, the process 1200 may be performed by the AP 610 to assign primary communication links on a per-client basis.

The AP may establish a first primary communication link with a first STA (1210). The first primary communication link may be associated with one or more first wireless channels. More specifically, access to the first primary communication link may be based on contention with the first STA. In some implementations, the first STA may be a single-MAC device and may therefore contend for access to a shared wireless medium (with the AP) only on the first primary communication link.

The AP may further establish a second primary communication link with a second STA (1220). The second primary communication link may be associated with one or more second wireless channels. More specifically, access to the second primary communication link may be based on contention with the second STA. In some implementations, the second STA may be a single-MAC device and may therefore contend for access to a shared wireless medium (with the AP) only on the second primary communication link.

The AP may selectively access a secondary communication link with at least one of the first STA or the second STA based at least in part on having access to the first primary communication link or the second primary communication link, respectively (1230). In some aspects, the secondary communication link for the first STA may be associated with the one or more second wireless channels and the secondary communication link for the second STA may be associated with the one or more first wireless channels. In some other aspects, the secondary communication link for a given STA may not overlap with any of the communication links for another STA. The AP may send or receive communications over the primary communication link and the secondary communication link for a given STA, concurrently, using link aggregation techniques. However, the AP may not access the secondary communication link with a given STA unless the AP has also gained access to the primary communication link with that STA (such as through contention).

Figure 13:
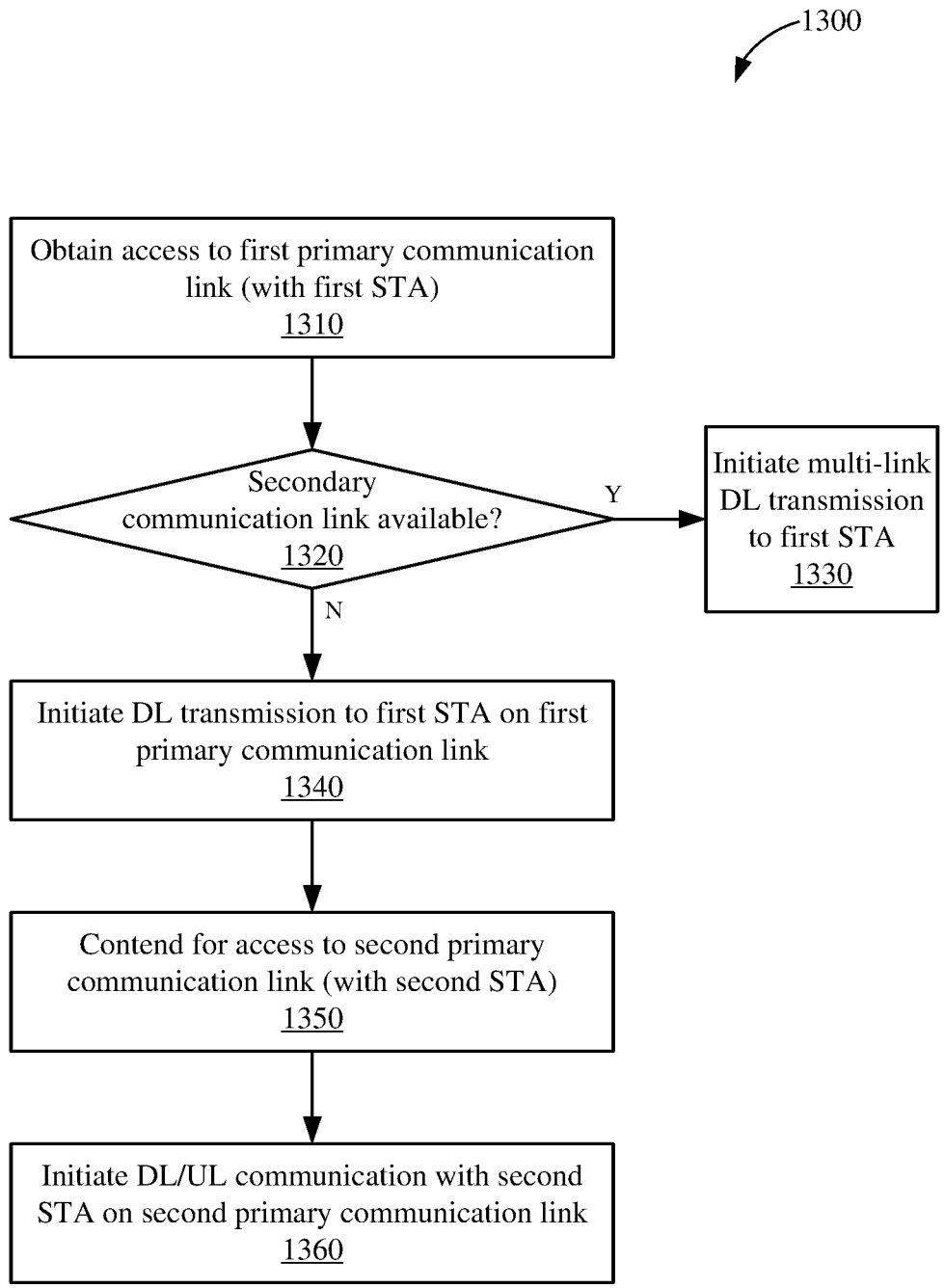
FIG. 13 shows a flowchart illustrating an example process for selectively utilizing the shared communication links in a multi-link environment according to some implementations.

FIG. 13 shows a flowchart illustrating an example process 1300 for selectively utilizing the shared communication links in a multi-link environment according to some implementations. The process 1300 may be performed by any AP capable of link aggregation. With reference for example to FIG. 6, the process 1300 may be performed by the AP 610 to selectively utilize the communication links for multi-link communications with a given STA or concurrent communications with multiple STAs.

The AP obtains access to a first primary communication link (1310) and determines whether a secondary communication link of the first STA is available for access (1320). For example, the first primary communication link may be associated with one or more first wireless channels and the secondary communication link may be associated with one or more second wireless channels. More specifically, access to the first primary communication link may be based on contention with a first STA. Upon gaining access to the first primary communication link, the AP may use energy detection techniques to sense the activity on the secondary communication link.

If the secondary communication link is available (as tested at 1320), the AP may initiate a multi-link DL transmission to the first STA (1330). For example, the AP may use link aggregation techniques to aggregate DL data for transmission across the first primary communication link and the secondary communication link for the first STA. If the secondary communication link of the first STA is not available (as tested at 1320), the AP may initiate a DL transmission to the first STA only on the first primary communication link (1340).

While transmitting the DL data to the first STA on the first primary communication link, the AP may contend for access to a second primary communication link (1350). For example, the second primary communication link may be associated with the one or more second wireless channels. More specifically, access to the second primary communication link may be based on contention with a second STA. Upon gaining access to the second primary communication link, the AP may exchange DL or UL communications with the second STA on the second primary communication link (1360). In this manner, the AP may communicate with the first STA on the first wireless channels (corresponding to the first primary communication link) while concurrently communicating with the second STA on the second wireless channels (corresponding to the second primary communication link).

Figure 14:
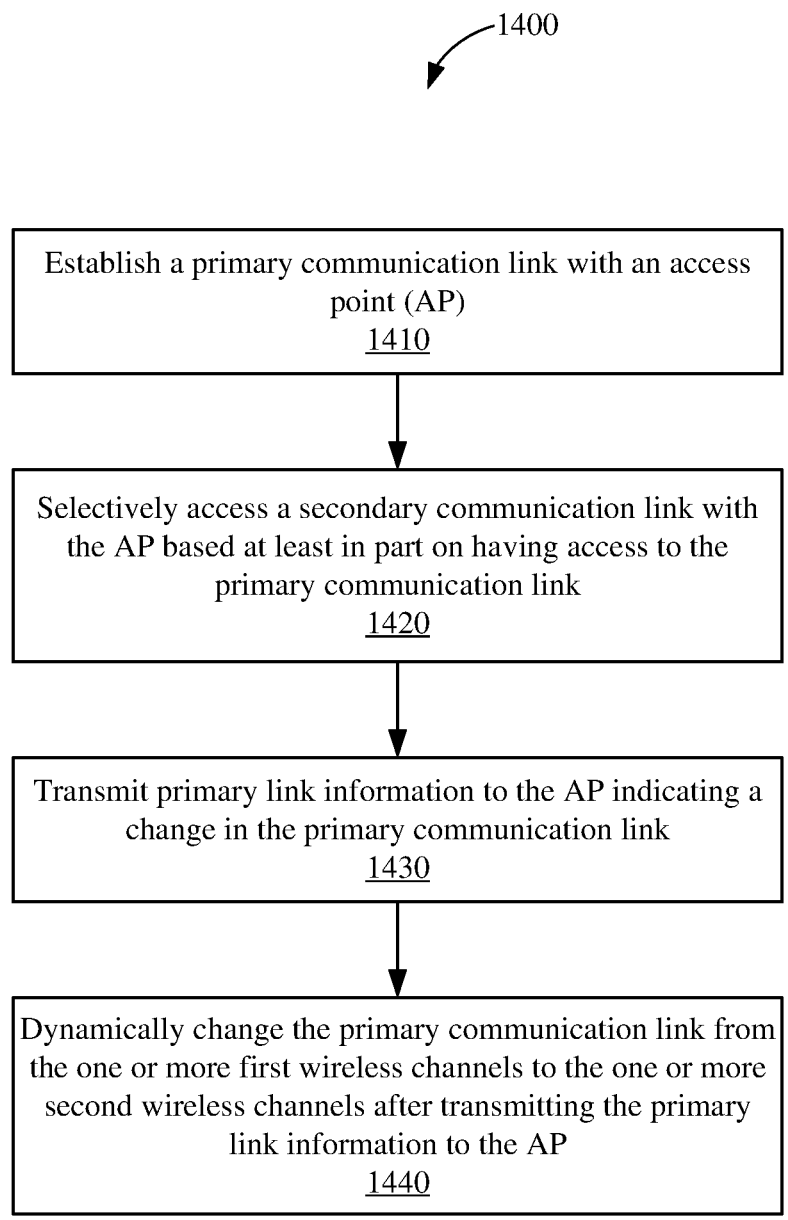
FIG. 14 shows a flowchart illustrating an example process for dynamically changing the primary link of a STA according to some implementations.

FIG. 14 shows a flowchart illustrating an example process 1400 for dynamically changing the primary link of a STA according to some implementations. The process 1400 may be performed by any STA capable of link aggregation. With reference for example to FIG. 6, the process 1400 may be performed by any of the wireless stations STA1-STA3 to dynamically change its primary link with the AP 610.

The STA may establish a primary communication link with the AP (1410). The primary communication link may be associated with one or more first wireless channels. More specifically, access to the primary communication link may be based on contention. In some implementations, the STA may be a single-MAC device and may therefore contend for access to a shared wireless medium (with the AP) only on the primary communication link.

The STA may selectively access a secondary communication link with the AP based at least in part on having access to the primary communication link (1420). The secondary communication link may be associated with one or more second wireless channels. More specifically, the STA may send or receive communications over the primary communication link and the secondary communication link, concurrently, using link aggregation techniques. However, the STA may not access the secondary communication link unless the STA already has already gained access to the primary communication link (such as through contention).

The STA may transmit primary link information to the AP indicating a change in the primary communication link (1430). For example, the primary link information may indicate a change to the primary communication link. Alternatively, or in addition, the primary link information may indicate a new subset of wireless channels (or a secondary communication link) to be subsequently used as the primary communication link. In some implementations, the primary link information may be provided in a data frame, management frame, or control frame. For example, the PL information may be provided in an OMI control field of a data frame.

The STA may dynamically change the primary communication link from the one or more first wireless channels to the one or more second wireless channels after transmitting the primary link information to the AP (1440). As a result of the change, the STA may subsequently contend for medium access on the one or more second wireless channels (the new primary communication link) and may attempt to access the one or more first wireless channels (the new secondary communication link) only after it has gained access to the primary communication link.

Figure 15:
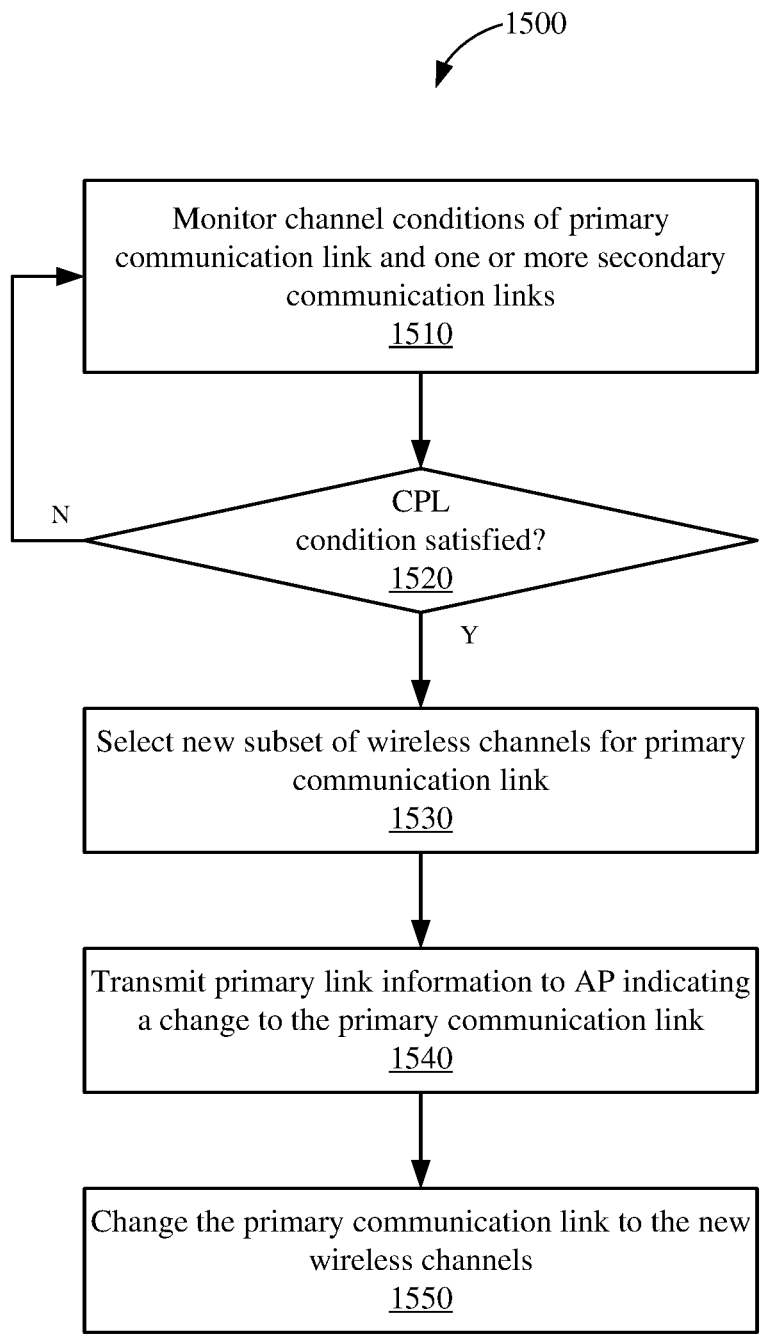
FIG. 15 shows a flowchart illustrating an example process for selectively reassigning the primary link of a STA according to some other implementations Like reference numbers and designations in the various drawings indicate like elements.

FIG. 15 shows a flowchart illustrating an example process 1500 for selectively reassigning the primary link of a STA according to some other implementations. The process 1500 may be performed by any STA capable of link aggregation. With reference for example to 6, the process 1500 may be performed by any of the wireless stations STA1-STA3 to selectively change its primary link with the AP 610.

The STA may monitor channel conditions of its primary communication link and one or more secondary communication links (1510). The channel conditions may correspond to an amount of activity (due to traffic or interference) on the primary communication link or the one or more secondary communication links. For example, the amount of activity may be based on a PER, SNR, latency, frequency of busy channel conditions on one or more of the communication links or a number of failed attempts to access one or more of the communication links. In some aspects, the STA may monitor the traffic patterns or activity of other STAs on each of the primary link and the secondary link. In some other aspects, the STA may learn the channel conditions on each of the communication links by correlating with past channel conditions on the primary link and the secondary link.

The STA may determine, based on the channel conditions, whether a change-in-primary-link (CPL) conditions is satisfied (1520). In some aspects, the CPL condition may be satisfied when the amount of activity on the primary communication link is above a threshold amount. In some other aspects, the CPL condition may be satisfied when the amount of activity on a secondary communication link is below a threshold amount. Still further, in some aspects, the CPL condition may be satisfied when the amount of activity on the primary communication link exceeds the amount of activity on one or more secondary communication links. As long as the CPL condition is not satisfied (as tested at 1520), the STA may continue monitoring the channel conditions of the communication links (1510).

If the CPL condition is satisfied (as tested at 1520), the STA may select a new subset of wireless channels for the primary communication link (1530). In some implementations, the STA may select the new subset of wireless channels based, at least in part, on the monitored channel conditions of the primary communications link and the one or more secondary communication links. For example, when the load or activity on a first subset of wireless channels associated with the primary communication link is relatively high (due to heavy data traffic or interference) while the load or activity on a second subset of wireless channels associated with the secondary communication link is relatively low, the STA may reassign the second subset of wireless channels to the primary communication link (and may reassign the first subset of wireless channels to the secondary communication link).

The STA may further transmit primary link information to other wireless devices indicating a change to the primary communication link (1540). For example, the primary link information may indicate a change to the primary communication link. Alternatively, or in addition, the primary link information may indicate the new wireless channels (or secondary communication link) to be subsequently used as the primary communication link. In some implementations, the primary link information may be provided in a data frame, management frame, or control frame. For example, the PL information may be provided in an OMI control field of a data frame.

The STA may change the primary communication link to the new wireless channels after transmitting the primary link information to the AP (1550). In some implementations, the change in the primary communication link may be effective immediately (such as at the time of transmission or reception of the primary link information). In some other implementations, the change in the primary communication link may take effect only after the STA receives an acknowledgement (ACK) from the AP acknowledging receipt of the PL information.

As used herein, a phrase referring to "at least one of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The term "wireless station" or "STA," as used herein, also may refer to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication performed by a wireless communication device, comprising: establishing a first primary communication link between the wireless communication device and a first wireless station (STA), the first primary communication link being associated with one or more first wireless channels, access to the first primary communication link being based on contention among the wireless communication device and the first STA; establishing a second primary communication link between the wireless communication device and a second STA, the second primary communication link being associated with one or more second wireless channels, access to the second primary communication link being based on contention among the wireless communication device and the second STA; selectively accessing a secondary communication link between the wireless communication device and at least one of the first STA or the second STA based at least in part on the wireless communication device having access to the first primary communication link or the second primary communication link, respectively receiving primary link information from the second STA indicating a change in the second primary communication link; and dynamically changing the second primary communication link from the one or more second wireless channels to the one or more first wireless channels based at least in part on the primary link information.

2. The method of claim 1, further comprising: contending for access to the first primary communication link; contending for access to the second primary communication link; and upon gaining access to the first and second primary communication links, concurrently transmitting downlink communications to the first STA and the second STA via the first primary communication link and the second primary communication link, respectively.

3. The method of claim 1, wherein the secondary communication link with the first STA is associated with the one or more second wireless channels, and wherein the selectively accessing comprises: attempting to use link aggregation to transmit downlink data to the first STA concurrently via the first primary communication link and the secondary communication link; and selectively contending for access to the second primary communication link based at least in part on the link aggregation attempt.

4. The method of claim 3, wherein the selectively contending comprises contending for access to the second primary communication link when the link aggregation attempt fails, and wherein the method further comprises, upon gaining access to the second primary communication link, concurrently transmitting downlink communications to the first STA and the second STA via the first primary communication link and the second primary communication link, respectively.

5. The method of claim 1, further comprising: transmitting a downlink communication to the first STA via the first primary communication link; and receiving an uplink communication from the second STA, via the second primary communication link, concurrently with the transmitting of the first downlink communication.

6. The method of claim 1, wherein the dynamic changing of the second primary communication link from the one or more second wireless channels to the one or more first wireless channels is further based on one or more channel conditions of the first wireless channels, the second wireless channels, or a combination thereof.

7. The method of claim 1, wherein receiving the primary link information includes receiving a data frame, a management frame, or a control frame, the data frame, management frame or control frame including an Operating Mode Indication (OMI) control field that includes the primary link information.

8. The method of claim 1, further comprising: scheduling access to at least one of the first primary communication link or the second primary communication link based at least in part on a target wake time (TWT) service period for the first STA or the second STA.

9. The method of claim 1, further comprising: transmitting flexibility information to the first STA and the second STA, the flexibility information indicating a capability to dynamically change the first primary communication link and the second primary communication link.

10. The method of claim 1, further comprising: broadcasting beacon frames on the one or more first wireless channels; and broadcasting Fast Initial Link Setup (FILS) discovery frames on the one or more second wireless channels.

11. A wireless communication device comprising: one or more processors; and a memory storing instructions that, when executed by the one or more processors, cause the wireless communication device to: establish a first primary communication link between the wireless communication device and a first wireless station (STA), the first primary communication link being associated with one or more first wireless channels, access to the first primary communication link being based on contention among the wireless communication device and the first STA; establish a second primary communication link between the wireless communication device and a second STA, the second primary communication link being associated with one or more second wireless channels, access to the second primary communication link being based on contention among the wireless communication device and the second STA; selectively access a secondary communication link between the wireless communication device and at least one of the first STA or the second STA based at least in part on the wireless communication device having access to the first primary communication link or the second primary communication link, respectively; receive primary link information from the second STA indicating a change in the second primary communication link; and dynamically change the second primary communication link from the one or more second wireless channels to the one or more first wireless channels based at least in part on the primary link information.

12. The wireless communication device of claim 11, wherein execution of the instructions further causes the wireless communication device to: contend for access to the first primary communication link; contend for access to the second primary communication link; and upon gaining access to the first and second primary communication links, concurrently transmit downlink communications to the first STA and the second STA via the first primary communication link and the second primary communication link, respectively.

13. The wireless communication device of claim 11, wherein the secondary communication link with the first STA is associated with the one or more second wireless channels, and wherein execution of the instructions for selectively accessing the secondary communication link causes the wireless communication device to: attempt to use link aggregation to transmit downlink data to the first STA concurrently via the first primary communication link and the secondary communication link; and selectively contend for access to the second primary communication link based at least in part on the link aggregation attempt.

14. The wireless communication device of claim 13, wherein execution of the instructions for selectively contending for access to the second primary communication link causes the wireless communication device to: contend for access to the second primary communication link when the link aggregation attempt fails; and upon gaining access to the second primary communication link, concurrently transmit downlink communications to the first STA and the second STA via the first primary communication link and the second primary communication link, respectively.

15. The wireless communication device of claim 11, wherein execution of the instructions further causes the wireless communication device to: transmit a downlink communication to the first STA via the first primary communication link; and receive an uplink communication from the second STA, via the second primary communication link, concurrently with the transmitting of the downlink communication to the first STA.

16. The wireless communication device of claim 11, wherein the dynamic changing of the second primary communication link from the one or more second wireless channels to the one or more first wireless channels is further based on one or more channel conditions of the first wireless channels, the second wireless channels, or a combination thereof.

17. The wireless communication device of claim 11, wherein execution of the instructions further causes the wireless communication device to: schedule access to at least one of the first primary communication link or the second primary communication link based at least in part on a target wake time (TWT) service period for the first STA or the second STA.

18. The wireless communication device of claim 11, wherein execution of the instructions further causes the wireless communication device to: transmit flexibility information to the first STA and the second STA, the flexibility information indicating a capability of the wireless communication device to dynamically change the first primary communication link and the second primary communication link.

19. The wireless communication device of claim 11, wherein execution of the instructions further causes the wireless communication device to: broadcast beacon frames on the one or more first wireless channels; and broadcast Fast Initial Link Setup (FILS) discovery frames on the one or more second wireless channels.

20. A method for wireless communication performed by a wireless communication device, comprising: establishing a primary communication link between the wireless communication device and an access point (AP), the primary communication link being associated with one or more first wireless channels, access to the primary communication link being based on contention among the wireless communication device and the AP; selectively accessing a secondary communication link between the wireless communication device and the AP based at least in part on having access to the primary communication link, the secondary communication link being associated with one or more second wireless channels; transmitting primary link information to the AP indicating a change in the primary communication link; and dynamically changing the primary communication link from the one or more first wireless channels to the one or more second wireless channels after transmitting the primary link information to the AP.

21. The method of claim 20, wherein the transmitting comprises: determining that an amount of activity on the first wireless channels is above a first threshold level, an amount of activity on the second wireless channels is below a second threshold level, the amount of activity on the first wireless channels exceeds the amount of activity on the second wireless channels, or a combination thereof.

22. The method of claim 21, wherein the amount of activity on the first wireless channels is based on a frequency of busy channel conditions on the first wireless channels, a number of failed attempts to access the first wireless channels, a packet error rate (PER) of communications on the first wireless channels, or a latency of communications on the first wireless channels, and wherein the amount of activity on the second wireless channels is based on a frequency of busy channel conditions on the second wireless channels, a number of failed attempts to access the second wireless channels, a PER of communication on the second wireless channels, or a latency of communications on the first wireless channels.

23. The method of claim 20, wherein transmitting the primary link information includes transmitting a data frame, a management frame, or a control frame, the data frame, management frame or control frame including an Operating Mode Indication (OMI) control field that includes the primary link information.

24. The method of claim 20, further comprising: transmitting flexibility information to the AP, the flexibility information indicating a capability to dynamically change the primary communication link.

25. A wireless communication device comprising: one or more processors; and a memory storing instructions that, when executed by the one or more processors, cause the wireless communication device to: establish a primary communication link between the wireless communication device and an access point (AP), the primary communication link being associated with one or more first wireless channels, access to the primary communication link being based on contention among the wireless communication device and the AP; selectively access a secondary communication link between the wireless communication device and the AP based at least in part on having access to the primary communication link, the secondary communication link being associated with one or more second wireless channels; transmit primary link information to the AP indicating a change in the primary communication link; and dynamically change the primary communication link from the one or more first wireless channels to the one or more second wireless channels after transmitting the primary link information to the AP.

26. The wireless communication device of claim 25, wherein execution of the instructions for transmitting the primary link information to the AP causes the wireless communication device to: determine that an amount of activity on the first wireless channels is above a first threshold level, an amount of activity on the second wireless channels is below a second threshold level, the amount of activity on the first wireless channels exceeds the amount of activity on the second wireless channels, or a combination thereof.

27. The wireless communication device of claim 25, wherein execution of the instructions for transmitting the primary link information to the AP causes the wireless communication device to transmit a data frame, a management frame, or a control frame, the data frame, management frame or control frame including an Operating Mode Indication (OMI) control field that includes the primary link information.

28. The wireless communication device of claim 25, wherein execution of the instructions further causes the wireless communication device to: transmit flexibility information to the AP, the flexibility information indicating a capability of the wireless communication device to dynamically change the primary communication link.

* * * * *